(12) United States Patent
Sasaki et al.

(10) Patent No.: US 9,840,630 B2
(45) Date of Patent: Dec. 12, 2017

(54) COMPOSITE STRUCTURE, PACKAGING MATERIAL AND FORMED PRODUCT USING SAME, PRODUCTION METHODS THEREOF, AND COATING LIQUID

(71) Applicant: KURARAY CO., LTD., Kurashiki-shi (JP)

(72) Inventors: Ryoichi Sasaki, Kurashiki (JP); Kentaro Yoshida, Houston, TX (US); Mamoru Omoda, Soja (JP); Wataru Hirose, Kurashiki (JP); Manabu Shibata, Kurashiki (JP); Tatsuya Oshita, Kurashiki (JP)

(73) Assignee: KURARAY CO., LTD., Kurashiki-shi (JP)

( * ) Notice: Subject to any disclaimer, the term of this patent is extended or adjusted under 35 U.S.C. 154(b) by 395 days.

(21) Appl. No.: 14/349,251

(22) PCT Filed: Oct. 5, 2012

(86) PCT No.: PCT/JP2012/006432
§ 371 (c)(1),
(2) Date: Apr. 2, 2014

(87) PCT Pub. No.: WO2013/051286
PCT Pub. Date: Apr. 11, 2013

(65) Prior Publication Data
US 2014/0248449 A1    Sep. 4, 2014

(30) Foreign Application Priority Data
Oct. 5, 2011   (JP) .................. 2011-221074

(51) Int. Cl.
| B29D 22/00 | (2006.01) |
| C09D 7/12 | (2006.01) |
| C09D 1/00 | (2006.01) |
| C09D 105/00 | (2006.01) |
| C09D 133/02 | (2006.01) |

(52) U.S. Cl.
CPC ............. *C09D 7/1233* (2013.01); *C09D 1/00* (2013.01); *C09D 105/00* (2013.01); *C09D 133/02* (2013.01); *Y10T 428/1307* (2015.01); *Y10T 428/1334* (2015.01); *Y10T 428/1393* (2015.01)

(58) Field of Classification Search
CPC ...... C09D 7/1216; C09D 7/1233; C09D 1/00; C09D 105/00; C09D 133/02; Y10T 428/1307; Y10T 428/131; Y10T 428/1334; Y10T 428/1393; C04B 35/62222; C04B 35/624; C23C 18/12; C23C 18/1208; C23C 18/1216; C23C 18/1254

USPC ......... 428/34.3, 34.4, 35.2, 35.3, 35.4, 35.8, 428/36.91, 446; 427/387, 397.7; 524/140; 501/12, 111, 118, 127, 128
See application file for complete search history.

(56) References Cited

U.S. PATENT DOCUMENTS

| 6,284,682 | B1 | 9/2001 | Troczynski et al. |
| 6,465,959 | B1 * | 10/2002 | Tian ....................... C03C 1/008 313/110 |
| 8,617,703 | B2 | 12/2013 | Hirose et al. |
| 2005/0175831 | A1 | 8/2005 | Kim et al. |
| 2006/0293448 | A1 | 12/2006 | Nishiura et al. |
| 2007/0267135 | A1 | 11/2007 | Kim et al. |
| 2009/0171003 | A1 | 7/2009 | Nishiura et al. |
| 2010/0062246 | A1 | 3/2010 | Kim et al. |
| 2011/0027580 | A1 | 2/2011 | Hirose et al. |
| 2011/0033716 | A1 * | 2/2011 | Nishiura ................. C08L 29/04 428/447 |
| 2013/0034674 | A1 | 2/2013 | Yosida et al. |

FOREIGN PATENT DOCUMENTS

| CN | 101875820 A * | 11/2010 |
| EP | 2 266 794 A1 | 12/2010 |
| JP | 2003 508627 | 3/2003 |
| JP | 2006 175784 | 7/2006 |
| JP | 2007 523769 | 8/2007 |
| JP | 2008 516015 | 5/2008 |
| JP | 4961054 | 6/2012 |
| WO | WO 98/56213 A1 | 12/1998 |
| WO | WO 01/16052 A2 | 3/2001 |
| WO | WO 2006/042116 A2 | 4/2006 |
| WO | 2009 125800 | 10/2009 |

OTHER PUBLICATIONS

International Search Report dated Nov. 20, 2012 in PCT/JP12/006432 Filed Oct. 5, 2012.
U.S. Appl. No. 14/349,594, filed Apr. 3, 2014, Sasaki, et al.
U.S. Appl. No. 14/349,809, filed Apr. 4, 2014, Yoshida, et al.
Extended European Search Report dated May 12, 2015 in Patent Application No. 12839019.2.

* cited by examiner

Primary Examiner — Ruiyun Zhang
(74) Attorney, Agent, or Firm — Oblon, McClelland, Maier & Neustadt, L.L.P.

(57) ABSTRACT

A composite structure disclosed includes a base (X) and a layer (Y). The layer (Y) includes a mixture of a metal oxide (A), a phosphorus compound (B), and a compound ($L^a$) (silicon compound). Examples of the phosphorus compound (B) and the compound ($L^a$) include a compound containing a site capable of reacting with the metal oxide (A). When the number of moles of metal atoms (M) derived from the metal oxide (A) is denoted by $N_M$ and the number of moles of Si atoms derived from the compound ($L^a$) is denoted by $N_{Si}$, $0.01 \leq N_{Si}/N_M \leq 0.30$ is satisfied. When the number of moles of phosphorus atoms derived from the phosphorus compound (B) is denoted by $N_P$, $0.8 \leq N_M/N_P \leq 4.5$ is satisfied.

24 Claims, No Drawings

COMPOSITE STRUCTURE, PACKAGING MATERIAL AND FORMED PRODUCT USING SAME, PRODUCTION METHODS THEREOF, AND COATING LIQUID

CROSS REFERENCE TO RELATED APPLICATIONS

The present application is a 35 U.S.C. §371 national stage patent application of International patent application PCT/JP2012/006432, filed on Oct. 5, 2012, published as WO/2013/051286 on Apr. 11, 2013, the text of which is incorporated by reference, and claims the benefit of the filing date of Japanese application no. 2011-221074, filed on Oct. 5, 2011, the text of which is also incorporated by reference.

TECHNICAL FIELD

The present invention relates to: a composite structure; a packaging material and a formed product using the composite structure; production methods thereof and a coating liquid.

BACKGROUND ART

Packaging materials for packaging various articles such as foods are often required to have barrier properties against gases such as oxygen. The use of a packaging material having poor gas barrier properties may, for example, cause oxidation by oxygen or food decay by proliferation of microorganisms, thus leading to deterioration of the packaged article. Therefore, conventional packaging materials generally include a gas barrier layer for preventing transmission of oxygen etc.

Examples of such a gas barrier layer include layers made of vinyl alcohol polymers (e.g., polyvinyl alcohol and ethylene-vinyl alcohol copolymer). The layers made of these vinyl alcohol polymers have the advantages of being transparent and being less problematic in terms of disposal. However, the layers have the disadvantage of being poor in water vapor barrier properties.

A film in which a metal oxide (silicon oxide, aluminum oxide, magnesium oxide, or the like) is deposited on a polymer film is known as a gas barrier layer having barrier properties against oxygen and water vapor. However, the deposited metal oxide layer may be cracked due to deformation of or impact on the packaging material, resulting in marked deterioration of the gas barrier properties. In order to suppress the deterioration of barrier properties caused by deformation of or impact on a packaging material, JP 2006-175784 A (Patent Literature 1) discloses a gas barrier film in which a protective layer made of an organic compound is formed on an inorganic deposited layer. In the case of this film, however, the deterioration of gas barrier properties is not sufficiently suppressed.

As an example of employing a coating layer containing a phosphorus compound or a silicon compound, JP 2008-516015 T (Patent Literature 2) discloses a method for forming a coating layer using a solution in which an aluminum salt and a phosphoric acid ester are contained in an organic solvent. In addition, WO 2009/125800 A1 (Patent Literature 3) discloses a method for forming a coating layer using a solution containing silane and aluminum alkoxide.

CITATION LIST

Patent Literature

Patent Literature 1: JP 2006-175784 A
Patent Literature 2: JP 2008-516015 T
Patent Literature 3: WO 2009/125800 A1

SUMMARY OF INVENTION

Technical Problem

Currently, there is a demand for a packaging material that is excellent in oxygen barrier properties and water vapor barrier properties and that is less subject to barrier property deterioration due to deformation or impact. However, the above conventional techniques cannot adequately meet such a demand.

It is therefore one object of the present invention to provide a composite structure that is excellent in both gas barrier properties and water vapor barrier properties and that can maintain both of the barrier properties at high levels even after bending. Another object of the present invention is to provide a formed product formed using the composite structure. Still another object of the present invention is to provide a method for producing the composite structure.

Solution to Problem

As a result of a diligent study to attain the above objects, the present inventors have found that the use of a particular coating liquid allows formation of a coating layer that is excellent in both gas barrier properties and water vapor barrier properties and that can maintain both of the barrier properties at high levels even after bending. The coating liquid is one obtained by mixing: a hydrolytic condensate of a compound including a metal atom to which a hydrolyzable characteristic group is bonded; a phosphorus compound substantially free from any metal atoms; and a compound having a Si atom to which a hydrolyzable characteristic group is bonded. In particular, it has been revealed that when a Si compound having a particular structure is added in an amount within a particular range, the barrier properties can be maintained at high levels even after bending. Through a further study based on the new findings, the present inventors have completed the present invention.

That is, the composite structure of the present invention is a composite structure including a base (X) and a layer (Y) stacked on the base (X), the layer (Y) including a mixture of a metal oxide (A), a phosphorus compound (B), and a compound ($L^a$). The phosphorus compound (B) is a compound containing a site capable of reacting with the metal oxide (A). The compound ($L^a$) is a compound including a Si atom and at least one species bonded to the Si atom, the at least one species being selected from the group consisting of F, Cl, Br, I, RO—, RCOO—, (RCO)$_2$CH—, and NO$_3$, where R is selected from the group consisting of an alkyl group, an aralkyl group, an aryl group, and an alkenyl group. When the number of moles of metal atoms (M) derived from the metal oxide (A) in the layer (Y) is denoted by $N_M$ and the number of moles of Si atoms derived from the compound ($L^a$) in the layer (Y) is denoted by $N_{Si}$, $N_{Si}$ and $N_M$ satisfy $0.01 \leq N_{Si}/N_M \leq 0.30$. When the number of moles of phosphorus atoms derived from the phosphorus compound (B) in the layer (Y) is denoted by $N_P$, $N_M$ and $N_P$ satisfy $0.8 \leq N_M/N_P \leq 4.5$.

The compound ($L^a$) may be at least one compound ($L^1$) represented by the following formula (I) and/or at least one compound ($L^2$) represented by the following formula (II):

$$SiX^1_r R^1_{(4-r)} \qquad (I),$$

where:
 $X^1$ is selected from the group consisting of F, Cl, Br, I, $R^1O$—, $R^1COO$—, $(R^1CO)_2CH$—, and $NO_3$; $R^1$ is selected from the group consisting of an alkyl group, an aralkyl group, an aryl group, and an alkenyl group; and r represents an integer from 1 to 4; and

  (II), where:
$X^2$ is selected from the group consisting of F, Cl, Br, I, $R^2O-$, $R^2COO-$, $(R^2CO)_2CH-$, and $NO_3$; Z is an organic group having at least one functional group selected from the group consisting of a vinyl group, an epoxy group, a styryl group, a methacryl group, an acryl group, an amino group, a ureido group, a mercapto group, a sulfide group, an isocyanate group, a hydroxyl group, and a chloro group; $R^2$ is selected from the group consisting of an alkyl group, an aralkyl group, an aryl group, and an alkenyl group; p represents an integer from 1 to 3; q represents an integer from 1 to 3; and $2 \le (p+q) \le 4$ is satisfied.

When a plurality of $X^1$ are included in the formula (I), the plurality of $X^1$ may be the same as or different from each other. When a plurality of $R^1$ are included in the formula (I), the plurality of $R^1$ may be the same as or different from each other. When a plurality of $X^2$ are included in the formula (II), the plurality of $X^2$ may be the same as or different from each other. When a plurality of Z are included in the formula (II), the plurality of Z may be the same as or different from each other. When a plurality of $R^2$ are included in the formula (II), the plurality of $R^2$ may be the same as or different from each other.

$N_{Si}$ and $N_M$ may satisfy $0.04 \le N_{Si}/N_M \le 0.25$.

The compound ($L^a$) may include the compound ($L^1$). In this case, the compound ($L^1$) may be at least one compound selected from the group consisting of tetramethoxysilane, tetraethoxysilane, tetrapropoxysilane, tetrabutoxysilane, and derivatives thereof.

The compound ($L^a$) may include the compound ($L^2$). In this case, the functional group included in Z of the formula (II) may be an amino group and/or an isocyanate group.

The compound ($L^a$) may include the compound ($L^2$). In this case, the compound ($L^2$) may be at least one selected from the group consisting of γ-aminopropyltrimethoxysilane, γ-aminopropyltriethoxysilane, N-β-aminoethyl-γ-aminopropyltrimethoxysilane, N-β-aminoethyl-γ-aminopropyltriethoxysilane, γ-isocyanatopropyltrimethoxysilane, and γ-isocyanatopropyltriethoxysilane.

The compound ($L^a$) may include the compound ($L^2$). In this case, when the number of moles of the Si element included in the compound ($L^2$) is denoted by $N_{Si2}$, $N_{Si2}$ and $N_M$ may satisfy $0.01 \le N_{Si2}/N_M \le 0.10$.

The layer (Y) may include a reaction product (R). The reaction product (R) is a reaction product formed by a reaction at least between the metal oxide (A) and the phosphorus compound (B). That is, the metal oxide (A) and the phosphorus compound (B) which are included in the layer (Y) may react with each other. In addition, the metal oxide (A), the phosphorus compound (B), and the compound ($L^a$) which are included in the layer (Y) may react with each other.

The metal oxide (A) may be a hydrolytic condensate of a compound ($L^b$) containing the metal atom (M) to which a hydrolyzable characteristic group is bonded. For example, the compound ($L^b$) may include at least one compound ($L^3$) represented by the following formula (III):

  (III), where:
$M^3$ is selected from the group consisting of Al, Ti, and Zr; $X^3$ is selected from the group consisting of F, Cl, Br, I, $R^3O-$, $R^3COO-$, $(R^3CO)_2CH-$, and $NO_3$; $R^3$ is selected from the group consisting of an alkyl group, an aralkyl group, an aryl group, and an alkenyl group; n is equal to a valence of $M^3$; and m represents an integer from 1 to n.

When a plurality of $X^3$ are included in the formula (III), the plurality of $X^3$ may be the same as or different from each other. When a plurality of $R^3$ are included in the formula (III), the plurality of $R^3$ may be the same as or different from each other.

The compound ($L^b$) may include at least one compound selected from aluminum triisopropoxide and aluminum tri-s-butoxide.

The phosphorus compound (B) may be at least one compound selected from the group consisting of phosphoric acid, polyphosphoric acid, phosphorous acid, phosphonic acid, and derivatives thereof.

The layer (Y) may have an infrared absorption peak in a range of 1080 $cm^{-1}$ to 1130 $cm^{-1}$.

The layer (Y) may further include a polymer (C) containing at least one functional group (f) selected from the group consisting of a hydroxyl group, a carboxyl group, a carboxylic acid anhydride group, and a salt of a carboxyl group. For example, the polymer (C) may be at least one polymer selected from the group consisting of polyvinyl alcohol, ethylene-vinyl alcohol copolymer, a polysaccharide, polyacrylic acid, a salt of polyacrylic acid, polymethacrylic acid, and a salt of polymethacrylic acid.

The base (X) may be in the form of a layer. In this case, the base (X) may include at least one layer selected from the group consisting of a thermoplastic resin film layer, a paper layer, and an inorganic deposited layer.

The packaging material of the present invention includes the composite structure of the present invention. The formed product of the present invention includes the composite structure of the present invention. The formed product of the present invention may be a vertical form fill seal pouch, a vacuum packaging pouch, a spout pouch, a laminated tube container, an infusion bag, a container cover, a paper container, or a vacuum insulator.

The method of the present invention for producing a composite structure including a base (X) and a layer (Y) stacked on the base (X) includes: a step (I) of mixing at least a metal compound (A), a phosphorus compound (B) containing a site capable of reacting with the metal compound (A), a compound ($L^a$), and a solvent, so as to prepare a coating liquid (U) including the metal compound (A), the phosphorus compound (B), the compound ($L^a$), and the solvent; a step (II) of applying the coating liquid (U) onto the base (X) so as to form a precursor layer of the layer (Y) on the base (X); and a step (III) of subjecting the precursor layer to heat treatment at a temperature of 110° C. or more. The compound ($L^a$) is a compound including a Si atom and at least one species bonded to the Si atom, the at least one species being selected from the group consisting of F, Cl, Br, I, RO—, RCOO—, $(RCO)_2CH-$, and $NO_3$, where R is selected from the group consisting of an alkyl group, an aralkyl group, an aryl group, and an alkenyl group. In the coating liquid (U), when the number of moles of metal atoms (M) included in the metal oxide (A) is denoted by $N_M$ and the number of moles of Si atoms included in the compound ($L^a$) is denoted by $N_{Si}$, $N_{Si}$ and $N_M$ satisfy $0.01 \le N_{Si}/N_M \le 0.30$. In the coating liquid (U), when the number of moles of phosphorus atoms included in the phosphorus compound (B) is denoted by $N_P$, $N_M$ and $N_P$ satisfy $0.8 \le N_M/N_P \le 4.5$.

In the production method of the present invention, the compound ($L^a$) may be at least one compound ($L^1$) represented by the following formula (I) and/or at least one compound ($L^2$) represented by the following formula (II):

$$SiX^1_r R^1_{(4-r)} \qquad (I),$$

where:

$X^1$ is selected from the group consisting of F, Cl, Br, I, $R^1O$—, $R^1COO$—, $(R^1CO)_2CH$—, and $NO_3$; $R^1$ is selected from the group consisting of an alkyl group, an aralkyl group, an aryl group, and an alkenyl group; and r represents an integer from 1 to 4; and $$SiX^2_p Z_q R^2_{(4-p-q)} \qquad (II),$$

where:

$X^2$ is selected from the group consisting of F, Cl, Br, I, $R^2O$—, $R^2COO$—, $(R^2CO)_2CH$—, and $NO_3$; Z is an organic group having at least one functional group selected from the group consisting of a vinyl group, an epoxy group, a styryl group, a methacryl group, an acryl group, an amino group, a ureido group, a mercapto group, a sulfide group, an isocyanate group, a hydroxyl group, and a chloro group; $R^2$ is selected from the group consisting of an alkyl group, an aralkyl group, an aryl group, and an alkenyl group; p represents an integer from 1 to 3; q represents an integer from 1 to 3; and $2 \leq (p+q) \leq 4$ is satisfied.

When a plurality of $X^1$ are included in the formula (I), the plurality of $X^1$ may be the same as or different from each other. When a plurality of $R^1$ are included in the formula (I), the plurality of $R^1$ may be the same as or different from each other. When a plurality of $X^2$ are included in the formula (II), the plurality of $X^2$ may be the same as or different from each other. When a plurality of Z are included in the formula (II), the plurality of Z may be the same as or different from each other. When a plurality of $R^2$ are included in the formula (II), the plurality of $R^2$ may be the same as or different from each other.

In the production method of the present invention, $N_{Si}$ and $N_M$ may satisfy $0.04 \leq N_{Si}/N_M \leq 0.25$.

In the production method of the present invention, the compound ($L^a$) may include the compound ($L^1$). In this case, the compound ($L^1$) may be at least one compound selected from the group consisting of tetramethoxysilane, tetraethoxysilane, tetrapropoxysilane, tetrabutoxysilane, and derivatives thereof.

In the production method of the present invention, the compound ($L^a$) may include the compound ($L^2$). In this case, the functional group included in Z of the formula (II) may be an amino group and/or an isocyanate group.

In the production method of the present invention, the compound ($L^a$) may include the compound ($L^2$). In this case, the compound ($L^2$) may be at least one selected from the group consisting of γ-aminopropyltrimethoxysilane, γ-aminopropyltriethoxysilane, N-β-aminoethyl-γ-aminopropyltrimethoxysilane, N-β-aminoethyl-γ-aminopropyltriethoxysilane, γ-isocyanatopropyltrimethoxysilane, and γ-isocyanatopropyltriethoxysilane.

In the production method of the present invention, the compound ($L^a$) may include the compound ($L^2$). In this case, when the number of moles of the Si element included in the compound ($L^2$) is denoted by $N_{Si2}$, $N_{Si2}$ and $N_M$ may satisfy $0.01 \leq N_{Si2}/N_M \leq 0.10$.

In the production method of the present invention, the metal oxide (A) may be a hydrolytic condensate of a compound ($L^b$) containing the metal atom (M) to which a hydrolyzable characteristic group is bonded. In this case, the compound ($L^b$) may include at least one compound ($L^3$) represented by the following formula (III):

$$M^3 X^3_m R^3_{(n-m)} \qquad (III),$$

where:

$M^3$ is selected from the group consisting of Al, Ti, and Zr; $X^3$ is selected from the group consisting of F, Cl, Br, I, $R^3O$—, $R^3COO$—, $(R^3CO)_2CH$—, and $NO_3$; $R^3$ is selected from the group consisting of an alkyl group, an aralkyl group, an aryl group, and an alkenyl group; n is equal to a valence of $M^3$; and m represents an integer from 1 to n.

When a plurality of $X^3$ are included in the formula (III), the plurality of $X^3$ may be the same as or different from each other. When a plurality of $R^3$ are included in the formula (III), the plurality of $R^3$ may be the same as or different from each other.

In the production method of the present invention, the compound ($L^b$) may include at least one compound selected from aluminum triisopropoxide and aluminum tri-s-butoxide.

In the production method of the present invention, the phosphorus compound (B) may be at least one compound selected from the group consisting of phosphoric acid, polyphosphoric acid, phosphorous acid, phosphonic acid, and derivatives thereof.

In the production method of the present invention, the layer (Y) may further include a polymer (C) containing at least one functional group (f) selected from the group consisting of a hydroxyl group, a carboxyl group, a carboxylic acid anhydride group, and a salt of a carboxyl group.

In the production method of the present invention, the polymer (C) may be at least one polymer selected from the group consisting of polyvinyl alcohol, ethylene-vinyl alcohol copolymer, a polysaccharide, polyacrylic acid, a salt of polyacrylic acid, polymethacrylic acid, and a salt of polymethacrylic acid.

In the production method of the present invention, the step (I) may include: a step (a) of preparing a liquid (S) including the metal oxide (A); a step (b) of preparing a solution (T) including the phosphorus compound (B); and a step (c) of mixing the liquid (S) and the solution (T). In this case, the step (a) may include a step of obtaining the metal compound (A) by condensing at least one selected from the group consisting of the compound ($L^3$) and a hydrolysate of the compound ($L^3$).

In the production method of the present invention, the compound ($L^a$) may be mixed with the solution (T) in the step (b), or, the liquid (S), the solution (T), and the compound ($L^a$) may be mixed in the step (c).

In the production method of the present invention, the length of time of the heat treatment may be in the range of 0.1 seconds to 1 hour.

The coating liquid of the present invention includes a metal oxide (A), a phosphorus compound (B) containing a site capable of reacting with the metal oxide (A), a compound ($L^a$), and a solvent. The compound ($L^a$) is a compound including a Si atom and at least one species bonded to the Si atom, the at least one species being selected from the group consisting of F, Cl, Br, I, RO—, RCOO—, $(RCO)_2CH$—, and $NO_3$, where R is selected from the group consisting of an alkyl group, an aralkyl group, an aryl group, and an alkenyl group. When the number of moles of metal atoms (M) included in the metal oxide (A) is denoted by $N_M$ and the number of moles of Si atoms included in the compound ($L^a$) is denoted by $N_{Si}$, $N_{Si}$ and $N_M$ satisfy $0.01 \leq N_{Si}/N_M \leq 0.30$. When the number of moles of phosphorus atoms included in the phosphorus compound (B) is denoted by $N_P$, $N_M$ and $N_P$ satisfy $0.8 \leq N_M/N_P \leq 4.5$.

Advantageous Effects of Invention

The composite structure of the present invention is excellent in both gas barrier properties and water vapor barrier properties, and can maintain both of the barrier properties at high levels even after a bending process. In addition, according to the present invention, a composite structure excellent in appearance can be obtained. In addition, according to the production method of the present invention, the composite structure can easily be produced. In the present specification, the term "gas barrier properties" means barrier performance against other gases than water vapor, unless otherwise specified.

DESCRIPTION OF EMBODIMENTS

Hereinafter, embodiments of the present invention will be described. In the following description, specific materials (compounds etc.) are mentioned in some cases as examples of a material exhibiting a particular function. However, the present invention is not limited to embodiments using the specific materials. One of the materials mentioned as examples may be used alone or two or more thereof may be used in combination, unless otherwise specified.

[Composite Structure]

A composite structure of the present invention includes a base (X) and a layer (Y) stacked on the base (X). The layer (Y) includes a mixture of a metal oxide (A), a phosphorus compound (B), and a compound ($L^a$). The phosphorus compound (B) is a phosphorus compound containing a site capable of reacting with the metal oxide (A). The compound ($L^a$) is a compound including a Si atom and at least one species bonded to the Si atom, the at least one species being selected from the group consisting of F, Cl, Br, I, RO—, RCOO—, (RCO)$_2$CH—, and NO$_3$, where R is selected from the group consisting of an alkyl group, an aralkyl group, an aryl group, and an alkenyl group. From another aspect, the ($L^a$) is a silicon compound containing a site capable of reacting with the metal oxide (A). When the number of moles of metal atoms (M) derived from the metal oxide (A) in the layer (Y) is denoted by $N_M$ and the number of moles of Si atoms derived from the compound ($L^a$) in the layer (Y) is denoted by $N_{Si}$, $N_{Si}$ and $N_M$ satisfy $0.01 \leq N_{Si}/N_M \leq 0.30$. When the number of moles of phosphorus atoms derived from the phosphorus compound (B) in the layer (Y) is denoted by $N_P$, $N_M$ and $N_P$ satisfy $0.8 \leq N_M/N_P \leq 4.5$. The metal atoms (M) mean all metal atoms included in the metal oxide (A).

The mixture of the metal oxide (A), the phosphorus compound (B), and the compound ($L^a$) may include a reaction product (R). That is, the metal oxide (A) and the phosphorus compound (B) which are included in the mixture may react with each other. In addition, the metal oxide (A), the phosphorus compound (B), and the compound ($L^a$) which are included in the mixture may react with each other. Furthermore, all of any of the metal oxide (A), the phosphorus compound (B), and the compound ($L^a$) which are included in the mixture may be involved in the reaction. In addition, all of the metal oxide (A), all of the phosphorus compound (B), and all of the compound ($L^a$) may react with each other. In this case, the mixture may be composed only of the reaction product (R) or composed only of the reaction product (R) and the compound ($L^a$).

[Compound ($L^a$)]

The compound ($L^a$) may be at least one compound selected from the group consisting of a compound ($L^1$) represented by the formula (I) below, a compound ($L^{1'}$) represented by the formula (I') below, and a compound ($L^2$) represented by the formula (II) below. In addition, the compound ($L^a$) may be at least one compound ($L^1$) represented by the formula (I) below and/or at least one compound ($L^2$) represented by the formula (II) below.

The compound ($L^1$) is at least one compound represented by the chemical formula (I) given below.

$$SiX^1_r R^1_{(4-r)} \qquad (I)$$

where:
$X^1$ is selected from the group consisting of F, Cl, Br, I, R$^1$O—, R$^1$COO—, (R$^1$CO)$_2$CH—, and NO$_3$; R$^1$ is selected from the group consisting of an alkyl group, an aralkyl group, an aryl group, and an alkenyl group; and r represents an integer from 1 to 4.

When a plurality of $X^1$ are included in the formula (I), the plurality of $X^1$ may be the same as or different from each other. When a plurality of $R^1$ are included in the formula (I), the plurality of $R^1$ may be the same as or different from each other.

The compound ($L^{1'}$) is at least one compound represented by the chemical formula (I') given below.

$$SiR^1_{(3-r)} X^1_r\text{-G-}SiX^1_r R^1_{(3-r)} \qquad (I')$$

where:
$X^1$ is selected from the group consisting of F, Cl, Br, I, R$^1$O—, R$^1$COO—, (R$^1$CO)$_2$CH—, and NO$_3$; R$^1$ is selected from the group consisting of an alkyl group, an aralkyl group, an aryl group, and an alkenyl group; G represents an amino group, an alkylene group to which a substituent may be bonded, or a sulfide group; and r represents an integer from 1 to 3.

When a plurality of $X^1$ are included in the formula (I'), the plurality of $X^1$ may be the same as or different from each other. When a plurality of $R^1$ are included in the formula (I'), the plurality of $R^1$ may be the same as or different from each other.

$R^1$ is, for example, an alkyl group having 1 to 10 carbon atoms, and is preferably an alkyl group having 1 to 4 carbon atoms. In a preferred example, $X^1$ is a halogen atom or an alkoxy group (R$^1$O—) having 1 to 4 carbon atoms, $R^1$ bonded to Si is an alkyl group having 1 to 4 carbon atoms, and r is 3 or 4. In a particularly preferred example, $X^1$ is a halogen atom or an alkoxy group (R$^1$O—) having 1 to 4 carbon atoms, and r is 4.

Examples of the compound ($L^1$) include tetrachlorosilane, tetrabromosilane, tetramethoxysilane, tetraethoxysilane, methyltrimethoxysilane, ethyltrimethoxysilane, octyltrimethoxysilane, phenyltrimethoxysilane, vinyltrimethoxysilane, vinyltriethoxysilane, chlorotrimethoxysilane, chlorotriethoxysilane, dichlorodimethoxysilane, dichlorodiethoxysilane, trichloromethoxysilane, trichloroethoxysilane, and vinyltrichlorosilane. Among these, tetramethoxysilane and tetraethoxysilane can be mentioned as preferred examples of the compound ($L^1$) for obtaining a composite structure whose barrier properties are maintained at high levels after bending.

Examples of the compound ($L^1$) include 1,6-bis(trimethoxysilyl)hexane, 1,6-bis(triethoxysilyl)hexane, bis(3-(trimethoxysilyl)propyl)disulfide, bis(3-(trimethoxysilyl)propyl)tetrasulfide, bis(3-(triethoxysilyl)propyl)disulfide, bis(3-(triethoxysilyl)propyl)tetrasulfide, bis(trimethoxysilylpropyl)amine, and bis(triethoxysilylpropyl)amine. Among these, 1,6-bis(trimethoxysilyl)hexane, bis(3-(triethoxysilyl)propyl)disulfide, and bis(3-(triethoxysilyl)propyl)tetrasulfide can be mentioned as preferred examples of the compound ($L^{1'}$) for obtaining a composite structure whose barrier properties are maintained at high levels after bending.

The proportion of the compound ($L^1$) in the compound ($L^a$) is not particularly limited as long as the effect of the present invention is obtained. In an example, the compound ($L^a$) consists only of the compound ($L^1$).

The compound ($L^2$) is at least one compound represented by the chemical formula (II) given below.

$$SiX^2_p Z_q R^2_{(4-p-q)} \quad (II),$$

where:

$X^2$ is selected from the group consisting of F, Cl, Br, I, $R^2O—$, $R^2COO—$, $(R^2CO)_2CH—$, and $NO_3$; Z is an organic group having at least one functional group selected from the group consisting of a vinyl group, an epoxy group, a styryl group, a methacryl group, an acryl group, an amino group, a ureido group, a mercapto group, a sulfide group, an isocyanate group, a hydroxyl group, and a chloro group; $R^2$ is selected from the group consisting of an alkyl group, an aralkyl group, an aryl group, and an alkenyl group; p represents an integer from 1 to 3; q represents an integer from 1 to 3; and $2 \leq (p+q) \leq 4$ is satisfied.

When a plurality of $X^2$ are included in the formula (II), the plurality of $X^2$ may be the same as or different from each other. When a plurality of Z are included in the formula (II), the plurality of Z may be the same as or different from each other. When a plurality of $R^2$ are included in the formula (II), the plurality of $R^2$ may be the same as or different from each other.

$R^2$ is, for example, an alkyl group having 1 to 10 carbon atoms, and is preferably an alkyl group having 1 to 4 carbon atoms. The functional group included in Z is, for example, an amino group and/or an isocyanate group. In a preferred example, $X^2$ is a halogen atom or an alkoxy group ($R^2O—$) having 1 to 4 carbon atoms, Z is an alkyl group having 1 to 4 carbon atoms and including an isocyanate group or an amino group as a substituent, $R^2$ bonded to Si is an alkyl group having 1 to 4 carbon atoms, p is 2 or 3, q is 1 or 2, and $3 \leq (p+q) \leq 4$ is satisfied. In a particularly preferred example, $X^2$ is a halogen atom or an alkoxy group ($R^2O—$) having 1 to 4 carbon atoms, Z is an aminoalkyl group having 1 to 4 carbon atoms or an isocyanatoalkyl group having 1 to 4 carbon atoms, p is 3, and q is 1.

Examples of the compound ($L^2$) include γ-glycidoxypropyltrimethoxysilane, γ-glycidoxypropyltriethoxysilane, γ-glycidoxypropyltrichlorosilane, γ-aminopropyltrimethoxysilane, γ-aminopropyltriethoxysilane, γ-aminopropyltrichlorosilane, γ-chloropropyltrimethoxysilane, γ-chloropropyltriethoxysilane, γ-chloropropyltrichlorosilane, γ-bromopropyltrimethoxysilane, γ-bromopropyltriethoxysilane, γ-bromopropyltrichlorosilane, γ-mercaptopropyltrimethoxysilane, γ-mercaptopropyltriethoxysilane, γ-mercaptopropyltrichlorosilane, γ-isocyanatopropyltrimethoxysilane, γ-isocyanatopropyltriethoxysilane, γ-isocyanatopropyltrichlorosilane, γ-ureidopropyltrimethoxysilane, γ-ureidopropyltriethoxysilane, and γ-ureidopropyltrichlorosilane. Preferred examples of the compound ($L^2$) include γ-glycidoxypropyltrimethoxysilane, γ-glycidoxypropyltriethoxysilane, γ-chloropropyltrimethoxysilane, γ-chloropropyltriethoxysilane, γ-aminopropyltrimethoxysilane, and γ-aminopropyltriethoxysilane. Among these, γ-aminopropyltrimethoxysilane, γ-aminopropyltriethoxysilane, γ-isocyanatopropyltrimethoxysilane, and γ-isocyanatopropyltriethoxysilane can be mentioned as preferred examples of the compound ($L^2$) for obtaining a composite structure whose barrier properties are maintained at high levels after bending.

When $N_{Si}$ and $N_M$ satisfy $0.01 \leq N_{Si}/N_M \leq 0.30$ (e.g., $0.02 \leq N_{Si}/N_M \leq 0.28$), the composite structure of the present invention exhibits excellent oxygen barrier properties and water vapor barrier properties even after a bending process. In order to obtain the composite structure that is more excellent in the performance after a bending process, $N_{Si}$ and $N_M$ preferably satisfy $0.04 \leq N_{Si}/N_M \leq 0.25$ (e.g., $0.05 \leq N_{Si}/N_M \leq 0.24$).

When the number of moles of the Si element derived from the compound ($L^2$) in the layer (Y) is denoted by $N_{Si2}$, $N_{Si2}$ and $N_M$ preferably satisfy $0.01 \leq N_{Si2}/N_M \leq 0.10$. When this relation is satisfied, the performance before a bending process can be enhanced.

In the layer (Y), the compound ($L^a$) may or may not react with the metal oxide (A) and/or the phosphorus compound (B). In some cases where the reaction takes place, the bending resistance is improved compared to the case where the reaction does not take place.

[Metal Oxide (A)]

Examples of the metal atom (M) that is a constituent of the metal oxide (A) include metal atoms having two or more valences (e.g., two to four valences or three to four valences). Specific examples include: Group 2 metals in the periodic table, such as magnesium and calcium; Group 12 metals in the periodic table, such as zinc; Group 13 metals in the periodic table, such as aluminum; Group 14 metals in the periodic table, such as silicon; and transition metals such as titanium and zirconium. In some cases, silicon is classified as a semimetal. In the present specification, however, silicon is categorized as a metal. The metal atom (M) that is a constituent of the metal oxide (A) may be composed of one type of atoms or may include two or more types of atoms. Among the aforementioned examples, at least one selected from the group consisting of aluminum, titanium, and zirconium is preferable as the metal atom (M) that is a constituent of the metal oxide (A), in terms of ease of handling in production of the metal oxide (A) and in terms of more excellent gas barrier properties of the resultant composite structure. Particularly preferred is aluminum.

The total proportion of aluminum, titanium, and zirconium in the metal atom (M) may be 60 mol % or more, 70 mol % or more, 80 mol % or more, 90 mol % or more, 95 mol % or more, or 100 mol %. The proportion of aluminum in the metal atom (M) may be 60 mol % or more, 70 mol % or more, 80 mol % or more, 90 mol % or more, 95 mol % or more, or 100 mol %.

A metal oxide produced by a method such as liquid-phase synthesis, gas-phase synthesis, or solid grinding, can be used as the metal oxide (A). In view of the production efficiency and the controllability of the shape and size of the resultant metal oxide (A), a metal oxide produced by liquid-phase synthesis is preferable.

In the case of liquid-phase synthesis, a compound ($L^b$) in which a hydrolyzable characteristic group is bonded to the metal atom (M) is used as a raw material, the compound ($L^b$) is subjected to hydrolytic condensation, and thus the metal oxide (A) can be synthesized as a hydrolytic condensate of the compound ($L^b$). In the production of the hydrolytic condensate of the compound ($L^b$) by liquid-phase synthesis, the metal oxide (A) can be produced not only by the method using the compound ($L^b$) itself as a raw material but also by methods in which any one of the following is used as a raw material and subjected to condensation or hydrolytic condensation: a partial hydrolysate of the compound ($L^b$) formed by partial hydrolysis of the compound ($L^b$); a complete hydrolysate of the compound ($L^b$) formed by complete hydrolysis of the compound ($L^b$); a partial hydrolytic condensate of the compound ($L^b$) formed by partial hydrolytic condensation of the compound ($L^b$); a condensate formed by condensation of a part of a complete hydrolysate of the compound ($L^b$); and a mixture of two or more thereof. A hydrolytic condensate (A) of the compound ($L^b$) can be regarded substantially as a metal oxide. Therefore, in the present specification, the hydrolytic condensate (A) of the compound ($L^b$) may be referred to as the "metal oxide (A)". That is, in the present specification, the "metal oxide (A)" can be interpreted to mean the "hydrolytic condensate (A) of the compound ($L^b$)", and the "hydrolytic condensate (A) of the compound ($L^b$)" can be interpreted to mean the "metal oxide (A)". The type of the aforementioned hydrolyzable characteristic group (functional group) is not particularly limited. Examples thereof include halogen atoms (such as F, Cl, Br, and I), alkoxy groups, acyloxy groups, diacylmethyl groups, and nitro groups. In terms of excellent reaction controllability, halogen atoms and alkoxy groups are preferable, and alkoxy groups are more preferable.

In terms of easy reaction control and of excellent gas barrier properties of the resultant composite structure, the compound ($L^b$) preferably includes at least one compound ($L^3$) represented by the formula (III):

$$M^3X^3{}_m R^3{}_{(n-m)} \qquad (III),$$

where:

$M^3$ is selected from the group consisting of Al, Ti, and Zr; $X^3$ is selected from the group consisting of F, Cl, Br, I, $R^3O$—, $R^3COO$—, $(R^3CO)_2CH$—, and $NO_3$; $R^3$ is selected from the group consisting of an alkyl group, an aralkyl group, an aryl group, and an alkenyl group; n is equal to a valence of $M^3$; and m represents an integer from 1 to n.

When a plurality of $X^3$ are included in the formula (III), the plurality of $X^3$ may be the same as or different from each other. When a plurality of $R^3$ are included in the formula (III), the plurality of $R^3$ may be the same as or different from each other.

Examples of the alkyl group represented by $R^3$ include a methyl group, an ethyl group, a normal-propyl group, an isopropyl group, a normal-butyl group, a s-butyl group, a t-butyl group, and a 2-ethylhexyl group. Examples of the aralkyl group represented by $R^3$ include a benzyl group, a phenethyl group, and a trityl group. Examples of the aryl group represented by $R^3$ include a phenyl group, a naphthyl group, a tolyl group, a xylyl group, and a mesityl group. Examples of the alkenyl group represented by $R^3$ include a vinyl group and an allyl group. For example, $R^3$ is preferably an alkyl group having 1 to 10 carbon atoms, and is more preferably an alkyl group having 1 to 4 carbon atoms. $X^3$ is preferably F, Cl, Br, I, or $R^3O$—. In a preferred example of the compound ($L^3$), $X^3$ is a halogen atom (F, Cl, Br, I) or an alkoxy group ($R^3O$—) having 1 to 4 carbon atoms, and m is equal to n (the valence of $M^3$). In terms of ease of handling in production of the metal oxide (A) and in terms of more excellent gas barrier properties of the resultant composite structure, $M^3$ is preferably Al, Ti, or Zr, and is particularly preferably Al. In an example of the compound ($L^3$), $X^3$ is a halogen atom (F, Cl, Br, I) or an alkoxy group ($R^3O$—) having 1 to 4 carbon atoms, m is equal to n (the valence of $M^3$), and $M^3$ is Al.

Specific examples of the compound ($L^3$) include: aluminum compounds such as aluminum chloride, aluminum triethoxide, aluminum tri-normal-propoxide, aluminum tri-isopropoxide, aluminum tri-normal-butoxide, aluminum tri-s-butoxide, aluminum tri-t-butoxide, aluminum triacetate, aluminum acetylacetonate, and aluminum nitrate; titanium compounds such as titanium tetraisopropoxide, titanium tetra-normal-butoxide, titanium tetra(2-ethylhexoxide), titanium tetramethoxide, titanium tetraethoxide, and titanium acetylacetonate; and zirconium compounds such as zirconium tetra-normal-propoxide, zirconium tetrabutoxide, and zirconium tetraacetylacetonate. Among these, at least one compound selected from aluminum triisopropoxide and aluminum tri-s-butoxide is preferable as the compound ($L^3$). One type of compound may be used alone as the compound ($L^3$) or two or more types of compounds may be used in combination as the compound ($L^3$).

The proportion of the compound ($L^3$) in the compound ($L^b$) is not particularly limited as long as the effect of the present invention is obtained. For example, the proportion of other compounds than the compound ($L^3$) in the compound ($L^b$) is 20 mol % or less, 10 mol % or less, 5 mol % or less, or 0 mol %. In an example, the compound ($L^b$) consists only of the compound ($L^3$).

The other compounds than the compound ($L^3$) which are included in the compound ($L^b$) are not particularly limited as long as the effect of the present invention is obtained. Examples of the other compounds include a compound in which the aforementioned hydrolyzable characteristic group is bonded to a metal atom such as magnesium, calcium, zinc, or silicon.

At least some of the hydrolyzable characteristic groups included in the compound ($L^b$) are substituted by hydroxyl groups as a result of hydrolysis of the compound ($L^b$). Furthermore, the hydrolysate is condensed to form a compound in which the metal atoms (M) are bonded via oxygen atoms (O). By repetitions of the condensation, a compound that can be regarded substantially as a metal oxide is formed. Usually, hydroxyl groups are present in the surface of the thus-formed metal oxide (A).

In the present specification, a compound is categorized as the metal oxide (A) when the ratio of the number of moles of oxygen atoms bonded only to the metal atoms (M) to the number of moles of the metal atoms (M) ([the number of moles of oxygen atoms bonded only to the metal atoms (M)]/[the number of moles of the metal atoms (M)]) is 0.8 or more in the compound, where "oxygen atoms bonded only to the metal atoms (M)" include, for example, the oxygen atom (O) in the structure represented by M-O-M, and do not include, for example, oxygen atoms that are bonded to the metal atoms (M) and to hydrogen atoms (H) as is the case for the oxygen atom (O) in the structure represented by M-O—H. In the metal oxide (A), the above ratio is preferably 0.9 or more, more preferably 1.0 or more, and even more preferably 1.1 or more. The upper limit of the ratio is not particularly specified. When the valence of the metal atom (M) is denoted by n, the upper limit is usually represented by n/2.

In order for the above-described hydrolytic condensation to take place, it is important that the compound ($L^b$) have a hydrolyzable characteristic group (functional group). In the case where such a group is not bonded, a hydrolytic condensation reaction does not take place or proceeds very slowly, which makes difficult the preparation of the metal oxide (A) intended.

For example, the hydrolytic condensate can be produced from a particular raw material by a technique employed in commonly-known sol-gel processes. At least one, which may be referred to as a "compound ($L^b$)-based substance" hereinafter, selected from the group consisting of the compound ($L^b$), a partial hydrolysate of the compound ($L^b$), a complete hydrolysate of the compound ($L^b$), a partial hydrolytic condensate of the compound ($L^b$), and a condensate formed by condensation of a part of a complete hydrolysate of the compound ($L^b$), can be used as the raw material. These raw materials may be produced by commonly-known methods or may be commercially-available products. For example, the raw material that can be used is, but not particularly limited to, a condensate obtained by hydrolytic condensation of about 2 to 10 molecules of the compound ($L^b$). Specifically, for example, a dimeric to decameric condensate obtained by hydrolytic condensation of aluminum triisopropoxide can be used as a part of the raw material.

The number of condensed molecules in the hydrolytic condensate of the compound ($L^b$) can be controlled by the conditions for condensation or hydrolytic condensation of the compound ($L^b$)-based substance. For example, the number of condensed molecules can be controlled by the amount of water, the type and concentration of a catalyst, and the temperature and time of the condensation or hydrolytic condensation.

As described above, the layer (Y) included in the composite structure of the present invention includes the reaction product (R), and the reaction product (R) is a reaction product formed by a reaction at least between the metal oxide (A) and the phosphorus compound (B). Such a reaction product can be formed by mixing and reacting the metal oxide (A) with the phosphorus compound (B). The metal oxide (A) to be mixed with the phosphorus compound (B) (the metal oxide (A) immediately before mixing) may be the metal oxide (A) itself or may be in the form of a composition including the metal oxide (A). In a preferred example, the metal oxide (A) is mixed with the phosphorus compound (B) in the form of a liquid (a solution or a dispersion liquid) obtained by dissolving or dispersing the metal oxide (A) in a solvent.

A preferred method for producing the solution or dispersion liquid of the metal oxide (A) will be described hereinafter. Although a method for producing a dispersion liquid of the metal oxide (A) will be described using an example in which the metal oxide (A) is aluminum oxide (alumina), similar production methods can be employed for production of solutions or dispersion liquids of other metal oxides. A preferred alumina dispersion liquid can be obtained as follows: an alumina slurry is formed by subjecting an aluminum alkoxide to hydrolytic condensation in an aqueous solution whose pH has been adjusted by an acid catalyst as necessary, and then the slurry is deflocculated in the presence of a particular amount of an acid.

The temperature of the reaction system for the hydrolytic condensation of the aluminum alkoxide is not particularly limited. The temperature of the reaction system is usually in the range of 2° C. to 100° C. The liquid temperature is increased by contact between water and the aluminum alkoxide. However, there may be a case where an alcohol having a lower boiling point than water is formed as a by-product along with the progress of hydrolysis, and the alcohol is volatilized and thereby prevents the temperature of the reaction system from increasing from around the boiling point of the alcohol. In such a case, the growth of alumina may be slowed. Therefore, it is effective to remove the alcohol by heating up to around 95° C. The reaction time varies depending on the reaction conditions (the presence/absence, amount, and type of an acid catalyst). The reaction time is usually in the range of 0.01 hours to 60 hours, preferably in the range of 0.1 hours to 12 hours, and more preferably in the range of 0.1 hours to 6 hours. The reaction can be allowed to take place in an atmosphere of a gas such as air, carbon dioxide, nitrogen, and argon.

The molar amount of water used in the hydrolytic condensation is preferably 1 time to 200 times and more preferably 10 times to 100 times the molar amount of the aluminum alkoxide. The molar amount of water less than the molar amount of the aluminum alkoxide does not allow hydrolysis to proceed sufficiently, and thus is not preferable. The molar amount of water more than 200 times the molar amount of aluminum alkoxide leads to deterioration in production efficiency or increase in viscosity, and thus is not preferable. In the case where a water-containing substance (e.g., hydrochloric acid or nitric acid) is used, the amount of water used is preferably determined in view of the amount of water introduced with the substance.

As the acid catalyst used in the hydrolytic condensation, hydrochloric acid, sulfuric acid, nitric acid, p-toluenesulfonic acid, benzoic acid, acetic acid, lactic acid, butyric acid, carbonic acid, oxalic acid, maleic acid, or the like, can be used. Among these, hydrochloric acid, sulfuric acid, nitric acid, acetic acid, lactic acid, and butyric acid are preferable. More preferred are nitric acid and acetic acid. In the case where an acid catalyst is used at the time of hydrolytic condensation, the acid catalyst is preferably used in an appropriate amount depending on the type of the acid so that the pH is in the range of 2.0 to 4.0 before the hydrolytic condensation.

The alumina slurry itself obtained by the hydrolytic condensation may be used as the alumina dispersion liquid. However, when the obtained slurry is deflocculated by heating in the presence of a particular amount of an acid, a transparent alumina dispersion liquid excellent in viscosity stability can be obtained.

As the acid used at the time of deflocculation, a monovalent inorganic or organic acid such as nitric acid, hydrochloric acid, perchloric acid, formic acid, acetic acid, or propionic acid, can be used. Among these, nitric acid, hydrochloric acid, and acetic acid are preferable. More preferred are nitric acid and acetic acid.

In the case where nitric acid or hydrochloric acid is used as the acid for the deflocculation, the molar amount of the acid is preferably 0.001 times to 0.4 times and more preferably 0.005 times to 0.3 times the molar amount of aluminum atoms. When the molar amount of the acid is less than 0.001 times the molar amount of aluminum atoms, there may arise unfavorable situations, such as where the deflocculation does not proceed sufficiently or requires a very long time. When the molar amount of the acid is more than 0.4 times the molar amount of aluminum atoms, the temporal stability of the resultant alumina dispersion liquid tends to be reduced.

In the case where acetic acid is used as the acid for the deflocculation, the molar amount of the acid is preferably 0.01 times to 1.0 times and more preferably 0.05 times to 0.5 times the molar amount of aluminum atoms. When the molar amount of the acid is less than 0.01 times the molar amount of aluminum atoms, there may arise unfavorable situations, such as where the deflocculation does not proceed sufficiently or requires a very long time. When the molar amount of the acid is more than 1.0 time the molar amount of aluminum atoms, the temporal stability of the resultant alumina dispersion liquid tends to be reduced.

The acid to be present at the time of deflocculation may be added at the time of hydrolytic condensation. In the case where the acid has been lost as a result of removal of an alcohol formed as a by-product in the hydrolytic condensation, the acid is preferably added again so that the amount of the acid falls within the above range.

When the deflocculation is carried out at a temperature in the range of 40° C. to 200° C., the deflocculation can be completed in a short time with a moderate amount of the acid, and an alumina dispersion liquid containing a desired size of particles and being excellent in viscosity stability can be produced. The deflocculation temperature less than 40° C. causes the deflocculation to require a long time, and thus is not preferable. The deflocculation temperature more than 200° C. is not preferable either, since increasing the temperature beyond 200° C. requires a high-pressure resistant container or the like and is economically disadvantageous in spite of providing only a slight increase in deflocculation rate.

An alumina dispersion liquid having a predetermined concentration can be obtained by performing dilution with a solvent or concentration by heating as necessary after the completion of the deflocculation. In the case where heat concentration is performed, the heat concentration is preferably performed at 60° C. or less under reduced pressure in order to suppress viscosity increase or gelation.

[Phosphorus Compound (B)]

The phosphorus compound (B) contains a site capable of reacting with the metal oxide (A), and typically contains a plurality of such sites. In a preferred example, the phosphorus compound (B) contains 2 to 20 such sites (atomic groups or functional groups). Examples of such a site include a site capable of reacting with a functional group (e.g., hydroxyl group) present in the surface of the metal oxide (A). Examples of such a site include a halogen atom directly bonded to a phosphorus atom, and an oxygen atom directly bonded to a phosphorus atom. For example, a compound having a structure in which a halogen atom or an oxygen atom is directly bonded to a phosphorus atom can be used as the phosphorus compound (B). Such a phosphorus compound (B) is bonded to the metal oxide (A) by condensation (hydrolytic condensation) with hydroxyl groups present in the surface of the metal oxide (A). The phosphorus compound (B) may contain one phosphorus atom or may contain two or more phosphorus atoms.

The phosphorus compound (B) may be at least one compound selected from the group consisting of phosphoric acid, polyphosphoric acid, phosphorous acid, phosphonic acid, and derivatives thereof. Examples of the polyphosphoric acid include pyrophosphoric acid, triphosphoric acid, and polyphosphoric acid resulting from condensation of four or more phosphoric acid molecules. Examples of the derivatives include salts, (partial) esters, halides (chlorides etc.), and dehydration products (diphosphorus pentoxide etc.), of phosphoric acid, polyphosphoric acid, phosphorous acid, and phosphonic acid. In addition, examples of the derivatives of phosphonic acid include compounds in which a hydrogen atom directly bonded to a phosphorus atom of phosphonic acid (H—P(=O)(OH)$_2$) is substituted by an alkyl group that may have various types of functional groups, and examples of such compounds include nitrilotris (methylenephosphonic acid) and N,N,N',N'-ethylenediaminetetrakis(methylenephosphonic acid). Examples of the derivatives of phosphonic acid include also salts, (partial) esters, halides, and dehydration products of such compounds. Furthermore, an organic polymer containing phosphorus atoms, such as phosphorylated starch, can also be used as the phosphorus compound (B). One of these phosphorus compounds (B) may be used alone or two or more thereof may be used in combination. Among these phosphorus compounds (B), phosphoric acid is preferably used alone or in combination with another phosphorus compound. The use of phosphoric acid makes it possible to improve the stability of the coating liquid (U) described later and obtain the composite structure that has more excellent barrier properties.

When the number of moles of phosphorus atoms derived from the phosphorus compound (B) in the layer (Y) is denoted by $N_P$, $N_M$ and $N_P$ satisfy $0.8 \leq N_M/N_P \leq 4.5$. $N_M$ and $N_P$ preferably satisfy $1.0 \leq N_M/N_P \leq 3.6$, and more preferably satisfy $1.1 \leq N_M/N_P \leq 3.0$. In the case where the value of $N_M/N_P$ is more than 3.0, the metal oxide (A) is excessive relative to the phosphorus compound (B), and thus the bonding between particles of the metal oxide (A) tends to be insufficient. In addition, in this case, the amount of hydroxyl groups present in the surface of the metal oxide (A) is increased. As a result, the barrier properties and the hot-water resistance tend to be deteriorated. On the other hand, in the case where the value of $N_M/N_P$ is less than 0.80, the phosphorus compound (B) is excessive relative to the metal oxide (A), and thus an excess amount of the phosphorus compound (B) that does not participate in the bonding with the metal oxide (A) is increased. In addition, in this case, the amount of hydroxyl groups derived from the phosphorus compound (B) is likely to be increased. As a result, the barrier properties and the hot-water resistance tend to be deteriorated.

In the layer (Y), the number of moles $N_{Si}$ of Si atoms derived from the compound ($L^a$) and the number of moles $N_P$ of phosphorus atoms derived from the phosphorus compound (B) may satisfy $1 < N_{Si}/N_P$, but preferably satisfy $0 \leq N_{Si}/N_P \leq 1$. When $N_{Si}/N_P$ is within this range, the composite structure that has more excellent barrier properties can be obtained.

The layer (Y) preferably has an infrared absorption peak in the range of 1080 cm$^{-1}$ to 1130 cm$^{-1}$. In terms of obtaining the composite structure that is more excellent in barrier properties and hot-water resistance, the infrared absorption peak is preferably present in the range of 1085 cm$^{-1}$ to 1120 cm$^{-1}$, and is more preferably present in the range of 1090 cm$^{-1}$ to 1110 cm$^{-1}$.

In general, the case is considered where a metal compound and a phosphorus compound react with each other to produce a bond represented by M-O—P in which a metal atom (M) that is a constituent of the metal compound and a phosphorus atom (P) that is derived from the phosphorus compound are bonded via an oxygen atom (O). In this case, a characteristic peak due to the bond represented by M-O—P appears in an infrared absorption spectrum. The peak is observed at a particular wavenumber under influence of the environment or structure around the bond. As a result of a study, the present inventors have found that a composite structure having excellent barrier properties and hot-water resistance can be obtained when the absorption peak due to the M-O—P bond is present in the range of 1080 cm$^{-1}$ to 1130 cm$^{-1}$.

[Polymer (C)]

The layer (Y) may further include a particular type of polymer (C). The polymer (C) is a polymer having at least one functional group (f) selected from the group consisting of a hydroxyl group, a carboxyl group, a carboxylic acid anhydride group, and a salt of a carboxyl group.

Examples of the polymer (C) that has a hydroxyl group include polyvinyl alcohol, partially-saponified polyvinyl acetate, polyethylene glycol, polyhydroxyethyl(meth)acrylate, polysaccharides such as starch, and polysaccharide derivatives derived from polysaccharides. Examples of the polymer (C) that has a carboxyl group, a carboxylic acid anhydride group, or a salt of a carboxyl group include polyacrylic acid, polymethacrylic acid, poly(acrylic acid/methacrylic acid), and salts thereof. Examples of the polymer (C) that has a constitutional unit free from the functional group (f) include ethylene-vinyl alcohol copolymer (EVOH), ethylene-maleic anhydride copolymer, styrene-maleic anhydride copolymer, isobutylene-maleic anhydride alternating copolymer, ethylene-acrylic acid copolymer, and saponified ethylene-ethyl acrylate copolymer. In order to obtain the composite structure that has more excellent barrier properties and hot-water resistance, the polymer (C) is preferably at least one polymer selected from the group consisting of polyvinyl alcohol, ethylene-vinyl alcohol copolymer, a polysaccharide, polyacrylic acid, a salt of polyacrylic acid, polymethacrylic acid, and a salt of polymethacrylic acid.

In order to obtain the composite structure that has more excellent barrier properties and hot-water resistance, the proportion of the constitutional units having the functional group (f) in all the constitutional units of the polymer (C) is preferably 10 mol % or more, more preferably 20 mol % or more, even more preferably 40 mol % or more, and particularly preferably 70 mol % or more, and may be 100 mol %.

The molecular weight of the polymer (C) is not particularly limited. In order to obtain the composite structure that has more excellent barrier properties and mechanical characteristics (drop impact resistance etc.), the number average molecular weight of the polymer (C) is preferably 5,000 or more, more preferably 8,000 or more, and even more preferably 10,000 or more. The upper limit of the number average molecular weight of the polymer (C) is not particularly specified, and is, for example, 1,500,000 or less.

The layer (Y) in the composite structure may consist only of a Si compound and the reaction product (R) of the metal oxide (A) and the phosphorus compound (B), or may further include other substances such as the polymer (C).

Examples of the other substances include: inorganic acid metal salts such as metal carbonates, metal hydrochlorides, metal nitrates, metal hydrogen carbonates, metal sulfates, metal hydrogen sulfates, metal borates, and metal aluminates; organic acid metal salts such as metal oxalates, metal acetates, metal tartrates, and metal stearates; metal complexes such as metal acetylacetonate complexes (aluminum acetylacetonate etc.), cyclopentadienyl metal complexes (titanocene etc.), and cyanometal complexes; layered clay compounds; crosslinking agents; polymer compounds other than the polymer (C); plasticizers; antioxidants; ultraviolet absorbers; and flame retardants.

The content of the other substances in the layer (Y) in the composite structure is preferably 50 mass % or less, more preferably 20 mass % or less, even more preferably 10 mass % or less, and particularly preferably 5 mass % or less, and may be 0 mass % (free from the other substances).

[Thickness of Layer (Y)]

The thickness of the layer (Y) included in the composite structure of the present invention (or the total thickness of layers (Y) when the composite structure includes two or more layers (Y)) is preferably 4.0 µm or less, more preferably 2.0 µm or less, even more preferably 1.0 µm or less, and particularly preferably 0.9 µm or less. When the layer (Y) is thin, the dimensional change of the composite structure during a process such as printing and lamination can be kept small, the flexibility of the composite structure is increased, and the mechanical characteristics of the composite structure can be made close to the mechanical characteristics of the base itself. Even in the case where the total thickness of the layer(s) (Y) is 1.0 µm or less (e.g., 0.5 µm or less), the composite structure of the present invention can have a moisture permeability of 5 g/(m$^2$·day) or less under conditions of 40° C. and 90/0% RH (relative humidity), and can have an oxygen transmission rate of 1 ml/(m$^2$·day·atm) or less under conditions of 20° C. and 85% RH (relative humidity). Here, "90/0% RH" means that the relative humidity on one side of the composite structure is 90% and the relative humidity on the other side is 0%. The thickness of the layer (Y) (or the total thickness of layers (Y) when the composite structure includes two or more layers (Y)) is preferably 0.1 µm or more (e.g., 0.2 µm or more). From the standpoint of better barrier properties of the composite structure of the present invention, the thickness of a single layer (Y) is preferably 0.05 µm or more (e.g., 0.15 µm or more). The thickness of the layer (Y) can be controlled by the concentration of the later-described coating liquid (U) used for formation of the layer (Y) or by the method for application of the coating liquid (U).

[Base (X)]

The material of the base (X) included in the composite structure of the present invention is not particularly limited, and a base made of any of various materials can be used. Examples of the material of the base (X) include: resins such as thermoplastic resins and thermosetting resins; fiber assemblies such as fabric and paper; wood; glass; metals; and metal oxides. The base may have a composite configuration made of a plurality of materials or may have a multi-layer configuration.

The form of the base (X) is not particularly limited. The base (X) may be a layer-shaped base such as a film or a sheet, or may be any of various formed bodies having a three-dimensional shape such as a spherical shape, a polygonal shape, or a pipe shape. Among these, a layer-shaped base is useful particularly when the composite structure (layered structure) is used as a packaging material for packaging foods etc.

Examples of the layer-shaped base include a single-layer or multi-layer base including at least one layer selected from the group consisting of a thermoplastic resin film layer, a thermosetting resin film layer, a fiber assembly sheet layer (a fabric layer, paper layer, or the like), a wood sheet layer, a glass layer, an inorganic deposited layer, and a metal foil layer. Among these, a base including at least one layer selected from the group consisting of a thermoplastic resin film layer, a paper layer, and an inorganic deposited layer is preferable. Such a base may be a single-layer base or a multi-layer base. The composite structure (layered structure) that uses such a base is excellent in processability into a packaging material and various characteristics required for use as a packaging material.

Examples of the thermoplastic resin film for forming the thermoplastic resin film layer may include films obtained by subjecting the following thermoplastic resins to forming processes: polyolefin resins such as polyethylene and polypropylene; polyester resins such as polyethylene terephthalate, polyethylene-2,6-naphthalate, polybutylene terephthalate, and copolymers thereof, polyamide resins such as nylon-6, nylon-66, and nylon-12; hydroxyl group-containing polymers such as polyvinyl alcohol and ethylene-vinyl alcohol copolymer; polystyrene; poly(meth)acrylic acid ester; polyacrylonitrile; polyvinyl acetate; polycarbonate; polyarylate; regenerated cellulose; polyimide; polyetherimide; polysulfone; polyethersulfone; polyetheretherketone; and ionomer resins. As the base of the layered body used as a packaging material for packaging foods etc., a film made of polyethylene, polypropylene, polyethylene terephthalate, nylon-6, or nylon-66 is preferable. For uses other than use in a packaging material, polymethyl(meth)acrylate, methyl (meth)acrylate/styrene copolymer, syndiotactic polystyrene, cyclic polyolefin, cyclic olefin copolymer, polyacetylcellulose, polyethylene naphthalate, polyvinyl acetal, polyvinyl butyral, polyvinyl chloride, polymethylpentene and the like, are also preferable as well as the above-mentioned thermoplastic resins for forming the thermoplastic film layer.

The thermoplastic resin film may be an oriented film or a non-oriented film. In terms of excellent suitability for processes (such as printing and lamination) of the resultant composite structure, an oriented film, particularly a biaxially-oriented film, is preferable. The biaxially-oriented film may be a biaxially-oriented film produced by any of a simultaneous biaxial orientation method, a sequential biaxial orientation method, and a tubular orientation method.

Examples of the paper used in the paper layer include kraft paper, high-quality paper, simili paper, glassine paper, parchment paper, synthetic paper, white paperboard, manila board, milk carton board, cup paper, and ivory paper. A layered structure for a paper container can be obtained by use of the base that includes the paper layer.

The inorganic deposited layer is preferably one having barrier properties against oxygen gas and water vapor, and more preferably one having transparency. The inorganic deposited layer can be formed by vapor-depositing an inorganic substance onto a substrate, and the whole layered body including the substrate and the inorganic deposited layer formed on the substrate can be used as the base (X) that has a multi-layer configuration. Examples of the inorganic deposited layer include: a layer formed of an inorganic oxide such as aluminum oxide, silicon oxide, silicon oxynitride, magnesium oxide, tin oxide, or a mixture thereof; a layer formed of an inorganic nitride such as silicon nitride or silicon carbonitride; and a layer formed of an inorganic carbide such as silicon carbide. Among these, a layer formed of aluminum oxide, silicon oxide, magnesium oxide, or silicon nitride is preferable from the standpoint of excellent barrier properties against oxygen gas and water vapor.

The preferred thickness of the inorganic deposited layer varies depending on the types of the constituents of the inorganic deposited layer, but is usually in the range of 2 nm to 500 nm. A thickness that allows good barrier properties and mechanical properties of the composite structure may be selected within the range. When the thickness of the inorganic deposited layer is less than 2 nm, there is a tendency that the repeatability of exhibition of the barrier properties of the inorganic deposited layer against oxygen gas and water vapor is reduced, and there may also be a case where the inorganic deposited layer does not exhibit sufficient barrier properties. When the thickness of the inorganic deposited layer is more than 500 nm, there is a tendency that the barrier properties of the inorganic deposited layer are likely to be deteriorated as a result of the composite structure being pulled or bent. The thickness of the inorganic deposited layer is more preferably in the range of 5 nm to 200 nm, and even more preferably in the range of 10 nm to 100 nm.

Examples of the method for forming the inorganic deposited layer may include vacuum deposition, sputtering, ion plating, and chemical vapor deposition (CVD). Among these, vacuum deposition is preferable from the standpoint of productivity. A heating technique used for vacuum deposition is preferably any of an electron beam heating technique, a resistive heating technique, and an induction heating technique. In order to improve the denseness of the inorganic deposited layer and the adhesiveness to the substrate on which the inorganic deposited layer is formed, the deposition may be performed by employing plasma-assisted deposition or ion beam-assisted deposition. In order to increase the transparency of the inorganic deposited layer, reactive deposition in which a reaction is caused by blowing oxygen gas or the like may be employed for the deposition.

In the case where the base (X) is in the form of a layer, the thickness of the base (X) is preferably in the range of 1 µm to 200 µm, more preferably in the range of 5 µm to 100 µm, and even more preferably in the range of 7 µm to 60 µm, from the standpoint of good mechanical strength and processability of the resultant composite structure.

[Adhesive Layer (H)]

In the composite structure of the present invention, the layer (Y) may be stacked in direct contact with the base (X). Alternatively, the layer (Y) may be stacked on the base (X) with an adhesive layer (H) interposed between the base (X) and the layer (Y). With this configuration, the adhesion between the base (X) and the layer (Y) can be enhanced in some cases. The adhesive layer (H) may be formed of an adhesive resin. The adhesive layer (H) made of an adhesive resin can be formed by treating the surface of the base (X) with a commonly-known anchor coating agent or by applying a commonly-known adhesive agent onto the surface of the base (X). As the adhesive agent, a two-component reactive polyurethane adhesive agent prepared by mixing and reacting a polyisocyanate component and a polyol component is preferable. There may be a case where the adhesion can be further enhanced by adding a small amount of additive such as a commonly-known silane coupling agent into the anchor coating agent or the adhesive agent. Suitable examples of the silane coupling agent include a silane coupling agent having a reactive group such as an isocyanate group, an epoxy group, an amino group, a ureido group, or a mercapto group. Strong adhesion between the base (X) and the layer (Y) via the adhesive layer (H) makes it possible to more effectively suppress deterioration of the barrier properties and appearance of the composite structure of the present invention when the composite structure is subjected to a process such as printing or lamination.

Increasing the thickness of the adhesive layer (H) can enhance the strength of the composite structure of the present invention. However, when the adhesive layer (H) is too thick, the appearance tends to be deteriorated. The thickness of the adhesive layer (H) is preferably in the range of 0.03 µm to 0.18 µm. With this configuration, deterioration of the barrier properties and appearance of the composite structure of the present invention can be suppressed more effectively when the composite structure is subjected to a process such as printing or lamination. Furthermore, the drop impact resistance of a packaging material using the composite structure of the present invention can be enhanced. The thickness of the adhesive layer (H) is more preferably in the range of 0.04 µm to 0.14 µm, and even more preferably in the range of 0.05 µm to 0.10 µm.

[Configuration of Composite Structure]

The composite structure (layered body) of the present invention may consist only of the base (X) and the layer (Y) or may consist only of the base (X), the layer (Y), and the adhesive layer (H). The composite structure of the present invention may include a plurality of layers (Y). The composite structure of the present invention may further include another member (e.g., another layer such as a thermoplastic resin film layer, a paper layer, or an inorganic deposited layer) other than the base (X), the layer (Y), and the adhesive layer (H). The composite structure of the present invention that has such another member (another layer or the like) can be produced by stacking the layer (Y) onto the base (X) directly or with the adhesive layer (H) interposed therebetween, and then by forming or adhering the other member (another layer or the like) onto the laminate directly or with an adhesive layer interposed therebetween. By having such another member (another layer or the like) included in the composite structure, the characteristics of the composite structure can be improved or additional characteristics can be imparted to the composite structure. For example, heat-sealing properties can be imparted to the composite structure of the present invention, or the barrier properties or mechanical properties can be further improved.

In particular, by forming a layer of a polyolefin as an outermost layer of the composite structure of the present invention, heat-sealing properties can be imparted to the composite structure, or the mechanical characteristics of the composite structure can be improved. From the standpoint of, for example, heat-sealing properties or improvement in mechanical characteristics, the polyolefin is preferably polypropylene or polyethylene. In addition, in order to improve the mechanical characteristics of the composite structure, at least one film selected from the group consisting of a film made of a polyester, a film made of a polyamide, and a film made of a hydroxyl group-containing polymer is preferably stacked as another layer. From the standpoint of improvement in mechanical characteristics, polyethylene terephthalate (PET) is preferable as the polyester, nylon-6 is preferable as the polyamide, and ethylene-vinyl alcohol copolymer is preferable as the hydroxyl group-containing polymer. Between the layers, an anchor coat layer or a layer made of an adhesive agent may be provided as necessary.

The composite structure of the present invention may include a surface protective layer disposed on one or both surfaces of the composite structure. A layer made of a scratch-resistant resin is preferable as the surface protective layer. The surface protective layer of a device such as a solar cell which may be used outdoors is preferably made of a resin having high weather resistance (e.g., light resistance). In the case of protecting a surface through which light needs to be transmitted, the surface protective layer preferably has high light transmissivity. Examples of the material of the surface protective layer (surface protective film) include acrylic resin, polycarbonate, polyethylene terephthalate, polyethylene naphthalate, ethylene-tetrafluoroethylene copolymer, polytetrafluoroethylene, tetrafluoroethylene-perchloroalkoxy copolymer, tetrafluoroethylene-hexafluoropropylene copolymer, difluoroethylene-tetrafluoroethylene copolymer, polychlorotrifluoroethylene, polyvinylidene fluoride, and polyvinyl fluoride. In an example, the composite structure includes an acrylic resin layer disposed on one surface thereof. Any of various additives (e.g., an ultraviolet absorber) may be added to the surface protective layer in order to enhance the durability of the surface protective layer. A preferred example of the surface protective layer that has high weather resistance is an acrylic resin layer having an ultraviolet absorber added thereto. Examples of the ultraviolet absorber include commonly-known ultraviolet absorbers, and specifically include benzotriazole-based, benzophenone-based, salicylate-based, cyanoacrylate-based, nickel-based, and triazine-based ultraviolet absorbers. Furthermore, a stabilizer, a light stabilizer, an antioxidant, or the like, may be additionally used.

The surface protective layer is stacked on a layered film (which may be referred to as a "barrier film" hereinafter) of the base and the barrier layer. The method for stacking the surface protective layer on the barrier film is not limited. For example, the surface protective layer and the barrier film may be adhered together using an adhesive layer. The adhesive layer can be selected depending on the type of the surface protective layer. For example, in the case where the surface protective layer is an acrylic resin film, polyvinyl acetal (e.g., polyvinyl butyral) may be used for the adhesive layer. In this case, the barrier film and the surface protective layer can be thermally-laminated with the adhesive layer interposed therebetween.

The composite structure of the present invention can be formed by stacking together at least one layer (Y) and at least another layer (including the base). Examples of the other layer include a polyester layer, a polyamide layer, a polyolefin layer (which may be a pigment-containing polyolefin layer, a heat-resistant polyolefin layer, or a biaxially-oriented heat-resistant polyolefin layer), a hydroxyl group-containing polymer layer (e.g., an ethylene-vinyl alcohol copolymer layer), a paper layer, an inorganic deposited film layer, a thermoplastic elastomer layer, and an adhesive layer. The number of these other layers, the number of the layers (Y), and the stacking order are not particularly limited as long as the composite structure includes the base and the layer (Y). The other layers may each be replaced by a formed body (formed body having a three-dimensional shape) that is made of the same material as the layer.

Specific examples of the configuration of the composite structure of the present invention are listed below. In the specific examples listed below, each of the layers may be replaced by a formed body (formed body having a three-dimensional shape) that is made of the same material as the layer. Although the composite structure may have an adhesive layer as exemplified by the adhesive layer (H), such an adhesive layer is omitted for the specific examples listed below.

(1) Layer (Y)/polyester layer,
(2) Layer (Y)/polyester layer/layer (Y),
(3) Layer (Y)/polyamide layer,
(4) Layer (Y)/polyamide layer/layer (Y),
(5) Layer (Y)/polyolefin layer,
(6) Layer (Y)/polyolefin layer/layer (Y),
(7) Layer (Y)/hydroxyl group-containing polymer layer,
(8) Layer (Y)/hydroxyl group-containing polymer layer/layer (Y),
(9) Layer (Y)/paper layer,
(10) Layer (Y)/paper layer/layer (Y),
(11) Layer (Y)/inorganic deposited film layer/polyester layer,
(12) Layer (Y)/inorganic deposited film layer/polyamide layer,
(13) Layer (Y)/inorganic deposited film layer/polyolefin layer,
(14) Layer (Y)/inorganic deposited film layer/hydroxyl group-containing polymer layer,
(15) Layer (Y)/polyester layer/polyamide layer/polyolefin layer,
(16) Layer (Y)/polyester layer/layer (Y)/polyamide layer/polyolefin layer,
(17) Polyester layer/layer (Y)/polyamide layer/polyolefin layer,
(18) Layer (Y)/polyamide layer/polyester layer/polyolefin layer,
(19) Layer (Y)/polyamide layer/layer (Y)/polyester layer/polyolefin layer,
(20) Polyamide layer/layer (Y)/polyester layer/polyolefin layer,
(21) Layer (Y)/polyolefin layer/polyamide layer/polyolefin layer,
(22) Layer (Y)/polyolefin layer/layer (Y)/polyamide layer/polyolefin layer,
(23) Polyolefin layer/layer (Y)/polyamide layer/polyolefin layer,
(24) Layer (Y)/polyolefin layer/polyolefin layer,
(25) Layer (Y)/polyolefin layer/layer (Y)/polyolefin layer,

(26) Polyolefin layer/layer (Y)/polyolefin layer,
(27) Layer (Y)/polyester layer/polyolefin layer,
(28) Layer (Y)/polyester layer/layer (Y)/polyolefin layer,
(29) Polyester layer/layer (Y)/polyolefin layer,
(30) Layer (Y)/polyamide layer/polyolefin layer,
(31) Layer (Y)/polyamide layer/layer (Y)/polyolefin layer,
(32) Polyamide layer/layer (Y)/polyolefin layer,
(33) Layer (Y)/polyester layer/paper layer,
(34) Layer (Y)/polyamide layer/paper layer,
(35) Layer (Y)/polyolefin layer/paper layer,
(36) Polyolefin layer/paper layer/polyolefin layer/layer (Y)/polyester layer/polyolefin layer,
(37) Polyolefin layer/paper layer/polyolefin layer/layer (Y)/polyamide layer/polyolefin layer,
(38) Polyolefin layer/paper layer/polyolefin layer/layer (Y)/polyolefin layer,
(39) Paper layer/polyolefin layer/layer (Y)/polyester layer/polyolefin layer,
(40) Polyolefin layer/paper layer/layer (Y)/polyolefin layer,
(41) Paper layer/layer (Y)/polyester layer/polyolefin layer,
(42) Paper layer/layer (Y)/polyolefin layer,
(43) Layer (Y)/paper layer/polyolefin layer,
(44) Layer (Y)/polyester layer/paper layer/polyolefin layer,
(45) Polyolefin layer/paper layer/polyolefin layer/layer (Y)/polyolefin layer/hydroxyl group-containing polymer layer,
(46) Polyolefin layer/paper layer/polyolefin layer/layer (Y)/polyolefin layer/polyamide layer,
(47) Polyolefin layer/paper layer/polyolefin layer/layer (Y)/polyolefin layer/polyester layer.

According to the present invention, a composite structure that possesses at least one of the features listed below can be obtained. In a preferred example, the composite structure in which the thickness of the layer (Y) (or the total thickness of layers (Y) when the composite structure includes two or more layers (Y)) is 1.0 µm or less (e.g., 0.9 µm or less, 0.8 µm or less, or 0.5 µm or less) possesses at least one of the features listed below.

(Feature 1) The moisture permeability under conditions of 40° C. and 90/0% RH is 5 g/(m²·day) or less.
(Feature 2) The oxygen transmission rate under conditions of 20° C. and 85% RH is 1 ml/(m²·day·atm) or less.

[Uses]

The composite structure of the present invention is excellent in both gas barrier properties and water vapor barrier properties, and can maintain both of the barrier properties at high levels even after a bending process. In addition, according to the present invention, a composite structure excellent in appearance can be obtained. Therefore, the present invention of the composite structure can be applied to various uses. The composite structure of the present invention is particularly preferably used as a packaging material. Examples of uses other than use as a packaging material include uses as the following: an electronic device-related film such as a substrate film for LCDs, a substrate film for organic EL devices, a substrate film for electronic paper, a sealing film for electronic devices, a film for PDPs, a film for LEDs, a film for IC tags, a back sheet for solar cells, and a protective film for solar cells; a member for optical communication; a flexible film for electronic equipment; a barrier membrane for fuel cells; a sealing film for fuel cells; and a substrate film for various functional films.

The composite structure of the present invention can be used as an alternative to glass for protecting the surface of a solar cell. That is, the use of the composite structure of the present invention makes it possible to avoid using a thick glass substrate having substantially no flexibility. However, the composite structure of the present invention may be used in a solar cell that includes a thick glass substrate.

A solar cell of the present invention can be obtained by fixing a protective film of the present invention to a predetermined surface of a solar cell. The method for fixing the protective film is not particularly limited. The protective film may be fixed by a commonly-known method, and may be fixed (adhered) using, for example, an adhesive layer such as an OCA (OPTICAL CLEAR ADHESIVE). Specifically, layer stacking may be performed using a separate adhesive layer from the protective film or using a protective film that includes an adhesive layer. The adhesive layer is not particularly limited. A commonly-known adhesive layer or the above-described adhesive layer may be used. Examples of the adhesive layer include a film functioning as an adhesive layer.

The solar cell for which the composite layered body of the present invention is used is not particularly limited. Examples of the solar cell include a silicon solar cell, a compound semiconductor solar cell, and an organic solar cell. Examples of the silicon solar cell include a monocrystalline silicon solar cell, a polycrystalline silicon solar cell, and an amorphous silicon solar cell. Examples of the compound semiconductor solar cell include a group III-V compound semiconductor solar cell, a group II-VI compound semiconductor solar cell, and a group I-III-VI compound semiconductor solar cell. The solar cell may or may not be an integrated solar cell having a plurality of unit cells connected in series.

The packaging material can be applied to various uses, and is preferable for uses in which barrier properties against oxygen or water vapor are required and for uses in which the air inside the packaging material is replaced by any of various functional gases. For example, the packaging material of the present invention is used preferably as a food packaging material. When used as a food packaging material, the packaging material of the present invention is suitably used particularly in a form having a fold line, such as in the form of a stand-up pouch. In addition, the packaging material of the present invention can be used preferably not only as a food packaging material but also as a packaging material for packaging chemicals such as agrochemicals and pharmaceuticals, medical devices, industrial materials such as machinery components and delicate materials, and garments.

A formed product of the present invention is formed using the packaging material of the present invention. The formed product of the present invention may be a vertical form fill seal pouch, a vacuum packaging pouch, a spout pouch, a laminated tube container, an infusion bag, a container cover, a paper container, or a vacuum insulator. The formed product of the present invention may also be a formed product other than a vacuum insulator.

Heat sealing is performed for the formed product (e.g., a vertical form fill seal pouch or the like) of the present invention. In the case where heat sealing is performed, it is usually necessary to dispose a heat-sealable layer on a side corresponding to the inner side of the formed product or on both sides corresponding to the inner side and outer side of the formed product. When the heat-sealable layer is provided only on a side corresponding to the inner side of the formed product (pouch), the body portion of the formed product is usually sealed with a fin seal. When the heat-sealable layer is provided on both sides corresponding to the inner side and outer side of the formed product, the body portion is usually sealed with a lap seal. A polyolefin layer (which may be referred to as a "PO layer" hereinafter) is preferable as the heat-sealable layer.

For example, the formed product of the present invention may be a vertical form fill seal pouch for packaging foods or beverages in the form of liquid, viscous body, powder, solid block, or mixture thereof. The vertical form fill seal pouch of the present invention is excellent in gas barrier properties and water vapor barrier properties, and undergoes less deterioration of the gas barrier properties and water vapor barrier properties even after a bending process. Therefore, with the vertical form fill seal pouch, quality degradation of the packaged article can be suppressed over a long period of time.

Hereinafter, a multi-layer film including the base (X) and the layer (Y) stacked on the base (X) may be referred to as a multi-layer barrier film. This multi-layer barrier film is also one type of the composite structure of the present invention. Layers for imparting various characteristics (e.g., heat sealing properties) may be stacked on the multi-layer barrier film. For example, the composite structure of the present invention may have a configuration of multi-layer barrier film/adhesive layer/polyolefin layer or a configuration of polyolefin layer/adhesive layer/multi-layer barrier film/adhesive layer/polyolefin layer. That is, the composite structure of the present invention may include a polyolefin layer disposed on one of the outermost surfaces. In addition, the composite structure of the present invention may include a first polyolefin layer disposed on one of the outermost surfaces and a second polyolefin layer disposed on the other outermost surface. The first polyolefin layer and the second polyolefin layer may be the same or different.

The vertical form fill seal pouch may be formed by stacking together at least one multi-layer barrier film and at least another layer. Examples of the other layer include a polyester layer, a polyamide layer, a polyolefin layer, a paper layer, an inorganic deposited film layer, an EVOH layer, and an adhesive layer. The number and stacking order of these layers are not particularly limited. In the case where heat sealing is performed, a configuration adapted for that purpose is employed.

Particularly preferred configurations of the composite structure for a vertical form fill seal pouch include a configuration of multi-layer barrier film/polyamide layer/PO layer, a configuration of multi-layer barrier film/PO layer, and a configuration of PO layer/multi-layer barrier film/PO layer. In these configurations, for example, a polyamide film can be used as the base of the multi-layer barrier film. The vertical form fill seal pouch is excellent particularly in the gas barrier properties and water vapor barrier properties exhibited after pouch formation, after heat sterilization, and after heat sterilization/transportation. Adhesive layers may be provided between the layers constituting the vertical form fill seal pouch. In the case where the layer (Y) of the composite structure of the present invention lies on one surface of the base, the layer (Y) may face either outwardly or inwardly of the vertical form fill seal pouch.

The formed product of the present invention may be a vacuum packaging pouch for packaging solid-containing foods etc. The vacuum packaging pouch is excellent in gas barrier properties and water vapor barrier properties, and undergoes less deterioration of the gas barrier properties and water vapor barrier properties even after a bending process. Therefore, in the vacuum packaging pouch, there is little deterioration of the gas barrier properties and water vapor barrier properties caused by deformation during vacuum packaging and heat sterilization. The vacuum packaging pouch is flexible, and closely adheres to solid-containing foods easily, so that degassing at the time of vacuum packaging is easy. Therefore, the vacuum packaging pouch allows reduction in the amount of residual oxygen in the vacuum packaging pouch, and is excellent in long-term food storage performance. In addition, since angulated portions or creased portions are less likely to be formed after vacuum packaging, defects such as pin holes and cracks are less likely to occur. Furthermore, the vacuum packaging pouch can suppress the occurrence of pin holes due to friction between the vacuum packaging pouches or between the vacuum packaging pouch and a cardboard. Moreover, since the vacuum packaging pouch is excellent in gas barrier properties and water vapor properties, the vacuum packaging pouch can suppress quality degradation of the packaged article (e.g., a food) over a long period of time.

The vacuum packaging pouch may be formed by stacking together at least one multi-layer barrier film and at least another layer. Examples of the other layer include a polyester layer, a polyamide layer, a polyolefin layer, an inorganic deposited film layer, an EVOH layer, and an adhesive layer. The number and stacking order of these layers are not particularly limited. In the case where heat sealing is performed, a configuration adapted for that purpose is employed.

Particularly preferred configurations of the composite structure for a vacuum packaging pouch include a configuration of multi-layer barrier film/polyamide layer/PO layer and a configuration of polyamide layer/multi-layer barrier film/PO layer. In these configurations, for example, a polyamide film can be used as the base of the multi-layer barrier film. The vacuum packaging pouch using such a composite structure is excellent particularly in the gas barrier properties exhibited after vacuum packaging or after vacuum packaging and heat sterilization. Adhesive layers may be provided between the above layers. In the case where the layer (Y) is stacked only on one surface of the base, the layer (Y) may be located outwardly or inwardly of the base in the vacuum packaging material.

The formed product of the present invention may be a spout pouch for packaging various liquid substances. The spout pouch can be used as a container for liquid drinks (e.g., soft drinks), jelly drinks, yogurts, fruit sauces, seasoning agents, functional water, liquid foods, etc. Also, the spout pouch can be preferably used as a container for liquid medical products such as amino acid infusions, electrolyte infusions, carbohydrate infusions, and fat emulsions for infusions. The spout pouch is excellent in gas barrier properties and water vapor barrier properties, and undergoes less deterioration of the gas barrier properties and water vapor barrier properties even after a bending process. Therefore, the use of the spout pouch makes it possible to prevent the packaged article from being altered by oxygen after transportation and after long-term storage. In addition, since the spout pouch has good transparency, it is easy to identify the packaged article or to check for alteration of the packaged article caused by degradation.

The spout pouch may be formed by stacking together at least one multi-layer barrier film and at least another layer. Examples of the other layer include a polyester layer, a polyamide layer, a polyolefin layer, an inorganic deposited film layer, an EVOH layer, and an adhesive layer. The number and stacking order of these layers are not particularly limited. In the case where heat sealing is performed, a configuration adapted for that purpose is employed.

Particularly preferred configurations of the composite structure for a spout pouch include a configuration of multi-layer barrier film/polyamide layer/PO layer and a configuration of a polyamide layer/multi-layer barrier film/PO layer. Adhesive layers may be provided between the above layers. In the case where the layer (Y) is stacked only on one surface of the base, the gas barrier layer may be located outwardly or inwardly of the base in the spout pouch.

The formed product of the present invention may be a laminated tube container for packaging cosmetics, chemicals, medical products, foods, dentifrices, etc. The laminated tube container is excellent in gas barrier properties and water vapor barrier properties, undergoes less deterioration of the gas barrier properties and water vapor barrier properties even after a bending process, and maintains the excellent gas barrier properties and water vapor barrier properties even after being squeezed in use. In addition, since the laminated tube container has good transparency, it is easy to identify the packaged article or to check for alteration of the packaged article caused by degradation.

The laminated tube container may be formed by stacking together at least one multi-layer barrier film and at least another layer. Examples of the other layer include a polyamide layer, a polyolefin layer (which may be a pigment-containing polyolefin layer), an inorganic deposited film layer, an EVOH layer, and an adhesive layer. The number and stacking order of these layers are not particularly limited. In the case where heat sealing is performed, a configuration adapted for that purpose is employed.

Particularly preferred configurations for a laminated tube container include a configuration of PO layer/multi-layer barrier film/PO layer and a configuration of PO layer/pigment-containing PO layer/PO layer/multi-layer barrier film/PO layer. Adhesive layers may be disposed between the above layers. In the case where the layer (Y) is stacked only on one surface of the base, the gas barrier layer may be located outwardly or inwardly of the base in the laminated tube container.

The formed product of the present invention may be an infusion bag, and may be, for example, an infusion bag to be filled with a liquid medical product such as an amino acid infusion, an electrolyte infusion, a carbohydrate infusion, or a fat emulsion for infusions. The infusion bag is excellent in gas barrier properties and water vapor barrier properties, and undergoes less deterioration of the gas barrier properties and water vapor barrier properties even after a bending process. Therefore, with the infusion bag, it is possible to prevent the packed liquid medical product from being altered by oxygen before heat sterilization, during heat sterilization, after heat sterilization, after transportation, and after storage.

The infusion bag may be formed by stacking together at least one multi-layer barrier film and at least another layer. Examples of the other layer include a polyamide layer, a polyolefin layer, an inorganic deposited film layer, an EVOH layer, a thermoplastic elastomer layer, and an adhesive layer. The number and stacking order of these layers are not particularly limited. In the case where heat sealing is performed, a configuration adapted for that purpose is employed.

Particularly preferred configurations of the composite structure for an infusion bag include a configuration of multi-layer barrier film/polyamide layer/PO layer and a configuration of polyamide layer/multi-layer barrier film/PO layer. Adhesive layers may be disposed between the above layers. In the case where the layer (Y) is stacked only on one surface of the base, the gas barrier layer may be located outwardly or inwardly of the base in the infusion bag.

The formed product of the present invention may be a cover of a container to be filled with foods such as processed meat products, processed vegetable products, processed seafood products, and fruits. The container cover is excellent in gas barrier properties and water vapor barrier properties, and undergoes less deterioration of the gas barrier properties and water vapor barrier properties even after a bending process. Therefore, quality degradation of the contained food can be suppressed over a long period of time. The container cover is used preferably as a cover of a container used for storage of the contained article such as a food product.

The container cover may be formed by stacking together at least one multi-layer barrier film and at least another layer. Examples of the other layer include a polyamide layer, a polyolefin layer, an inorganic deposited film layer, an EVOH layer, a polyester layer, a paper layer, and an adhesive layer. The number and stacking order of these layers are not particularly limited. In the case where heat sealing is performed, a configuration adapted for that purpose is employed.

Particularly preferred configurations of the composite structure for a container cover include a configuration of multi-layer barrier film/polyamide layer/PO layer and a configuration of multi-layer barrier film/PO layer. In these configurations, for example, a polyamide film can be used as the base of the multi-layer barrier film. The cover having such a configuration is excellent particularly in the gas barrier properties exhibited after heat sterilization or after heat sterilization/transportation. Adhesive layers may be provided between the above layers. In the case where the layer (Y) of the composite structure lies on one surface of the base, the layer (Y) may be located inwardly of the base (on the container-side) or outwardly of the base.

The formed product of the present invention may be a paper container. The paper container undergoes less deterioration of the gas barrier properties and water vapor barrier properties even when subjected to bending processing. The paper container is used preferably as a window container by virtue of the good transparency of the layer (Y). Furthermore, the paper container is suitable for heating by a microwave oven.

The paper container may be formed by stacking together at least one multi-layer barrier film and at least another layer. Examples of the other layer include a polyester layer, a polyamide layer, a polyolefin layer (which may be a heat-resistant polyolefin layer or a biaxially-oriented heat-resistant polyolefin layer), an inorganic deposited film layer, a hydroxyl group-containing polymer layer, a paper layer, and an adhesive layer. The number and stacking order of these layers are not particularly limited. In the case where heat sealing is performed, a configuration adapted for that purpose is employed.

Particularly preferred configurations of the composite structure for a paper container include a configuration of heat-resistant polyolefin layer/paper layer/heat-resistant polyolefin layer/multi-layer barrier film/heat-resistant polyolefin layer. Adhesive layers may be disposed between the above layers. In the above example, the heat-resistant polyolefin layers are composed of, for example, either a biaxially-oriented heat-resistant polyolefin film or a non-oriented heat-resistant polyolefin film. From the standpoint of ease of a forming process, the heat-resistant polyolefin layers disposed as the outermost layers of the composite structure are preferably non-oriented polypropylene films. Similarly, the heat-resistant polyolefin layer disposed inwardly of the outermost layers of the composite structure is preferably a non-oriented polypropylene film. In a preferred example, all the heat-resistant polyolefin layers included in the composite structure are non-oriented polypropylene films.

The formed product of the present invention may be a vacuum insulator applicable to various uses in which coldness or warmth needs to be kept. The vacuum insulator can maintain heat insulating effect over a long period of time, and thus can be used, for example, in the following: a heat insulating material for home electric appliances such as refrigerators, hot-water supply systems, and rice cookers; a residential heat insulating material used in walls, ceilings, attics, floors, etc.; a vehicle roof material; and an insulating panel of automatic vending machines etc.

The vacuum insulator may be formed by stacking together at least one multi-layer barrier film and at least another layer. Examples of the other layer include a polyester layer, a polyamide layer, a polyolefin layer, and an adhesive layer. The number and stacking order of these layers are not particularly limited. In the case where heat sealing is performed, a configuration adapted for that purpose is employed.

Particularly preferred configurations of the composite structure for a vacuum insulator include a configuration of multi-layer barrier film/polyamide layer/PO layer and a configuration of polyamide layer/multi-layer barrier film/PO layer. Adhesive layers may be provided between the above layers. In the case where the layer (Y) is stacked only on one surface of the base, the gas barrier layer may be located outwardly or inwardly of the base in the vacuum insulator.

Preferred examples of the configuration of the composite structure that is particularly preferable for a protective film of a solar cell are listed below. Although the composite structure may have the adhesive layer (H) between the base and the barrier layer, the adhesive layer (H) is omitted for the specific examples listed below.

(1) Barrier layer/base/barrier layer
(2) Base/barrier layer/adhesive layer/surface protective layer
(3) Barrier layer/base/barrier layer/adhesive layer/surface protective layer In preferred examples of the above configurations (1) to (3), the base is a polyethylene terephthalate film or a polycarbonate film. In preferred examples of the above configurations (2) and (3), the adhesive layer is made of polyvinyl acetal (e.g., polyvinyl butyral), and the surface protective layer is an acrylic resin layer. Furthermore, in other preferred examples of the above configurations (2) and (3), the adhesive layer is made of polyurethane, and the surface protective layer is made of ethylene-tetrafluoroethylene copolymer. The above configurations (2) and (3) are preferable for a protective film of a solar cell.

[Method for Producing Composite Structure]

Hereinafter, a composite structure production method of the present invention will be described. With this method, the composite structure of the present invention can easily be produced. The materials used for the composite structure production method of the present invention, and the configuration of the composite structure, are the same as those mentioned above. Therefore, redundant descriptions are omitted in some cases. For example, the descriptions on the composite structure of the present invention can be applied for the metal oxide (A), the phosphorus compound (B), the polymer (C), the compound ($L^a$), the compound ($L^1$), the compound ($L^{1'}$), the compound ($L^2$), and the compound ($L^3$). The matters described for the production method can be applied to the composite structure of the present invention. The matters described for the composite structure of the present invention can be applied to the production method of the present invention.

The composite structure production method of the present invention includes steps (I), (II), and (III). In the step (I), at least the metal oxide (A), the phosphorus compound (B) containing a site capable of reacting with the metal oxide (A), the compound ($L^a$), and a solvent are mixed to prepare the coating liquid (U) including the metal oxide (A), the phosphorus compound (B), the compound ($L^a$), and the solvent. In the step (II), the coating liquid (U) is applied onto the base (X) to form a precursor layer of the layer (Y) on the base (X). In the step (III), the precursor layer is subjected to heat treatment at a temperature of 110° C. or more.

In the coating liquid (U), when the number of moles of the metal atoms (M) included in the metal oxide (A) is denoted by $N_M$ and the number of moles of the Si atoms included in the compound ($L^a$) is denoted by $N_{Si}$, $N_{Si}$ and $N_M$ satisfy $0.01 \leq N_{Si}/N_M \leq 0.30$. In the coating liquid (U), when the number of moles of phosphorus atoms included in the phosphorus compound (B) is denoted by $N_P$, $N_M$ and $N_P$ satisfy $0.8 \leq N_M/N_P \leq 4.5$.

[Step (I)]

In the step (I), at least the metal oxide (A), the phosphorus compound (B), the compound ($L^a$), and the solvent are mixed. From one standpoint, at least a part of a raw material including the phosphorus compound (B), the compound ($L^a$), and the solvent is subjected to reaction in the solvent in the step (I). The raw material may include another compound in addition to the metal oxide (A), the phosphorus compound (B), and the compound ($L^a$). Typically, the metal oxide (A) is mixed in the form of particles.

In the coating liquid (U), the number of moles $N_{Si}$ of Si atoms included in the compound ($L^a$) and the number of moles $N_P$ of phosphorus atoms included in the phosphorus compound (B) may satisfy $1 < N_{Si}/N_P$, but preferably satisfy $0 \leq N_{Si}/N_P \leq 1$.

The step (I) preferably includes the following steps (a) to (c).

Step (a): Step of preparing a liquid (S) including the metal oxide (A)
Step (b): Step of preparing a solution (T) including the phosphorus compound (B)
Step (c): Step of mixing the liquid (S) and the solution (T) obtained in the steps (a) and (b)

The step (b) may be performed prior to or simultaneously with the step (a). Hereinafter, each of the steps will be described more specifically.

In the step (a), the liquid (S) containing the metal oxide (A) is prepared. The liquid (S) is a solution or a dispersion liquid. The liquid (S) can be prepared, for example, by a technique employed in commonly-known sol-gel processes. For example, the liquid (S) can be prepared by mixing the above-mentioned compound ($L^b$)-based substance, water, and an acid catalyst or organic solvent added as necessary, and subjecting the compound ($L^b$)-based substance to condensation or hydrolytic condensation by a technique employed in commonly-known sol-gel processes. A dispersion liquid itself of the metal oxide (A) obtained by condensation or hydrolytic condensation of the compound ($L^b$)-based substance can be used as the liquid (S) including the metal oxide (A). However, a particular process (deflocculation as described above, addition or removal of the solvent for concentration control, or the like) may be performed for the dispersion liquid as necessary.

The step (a) may include a step of obtaining the metal oxide (A) by subjecting, to condensation (e.g., hydrolytic condensation), at least one selected from the group consisting of the compound ($L^3$) and a hydrolysate of the compound ($L^3$). Specifically, the step (a) may include a step of subjecting, to condensation or hydrolytic condensation, at least one selected from the group consisting of the ($L^3$), a partial hydrolysate of the compound ($L^3$), a complete hydrolysate of the compound ($L^3$), a partial hydrolytic condensate of the compound ($L^3$), and a condensate formed by condensation of a part of a complete hydrolysate of the compound ($L^3$).

The compound ($L^a$) may be mixed with the solution (T) in the step (b), or, the liquid (S), the solution (T), and the compound ($L^a$) may be mixed in the step (c).

As another example of the method for preparing the liquid (S), there can be mentioned a method including the following steps. First, a metal is gasified by thermal energy in the form of metal atoms, and the metal atoms are brought into contact with a reaction gas (oxygen) to generate molecules and clusters of a metal oxide. Thereafter, the molecules and clusters are cooled instantly to produce small-diameter particles of the metal oxide (A). Next, the particles are dispersed in water or an organic solvent to obtain the liquid (S) (dispersion liquid including the metal oxide (A)). In order to enhance the dispersibility in water or an organic solvent, the particles of the metal oxide (A) may be subjected to surface treatment, or a stabilizing agent such as a surfactant may be added to the particles. The dispersibility of the metal oxide (A) may be improved by adjustment of the pH.

As still another example of the method for preparing the liquid (S), there can be mentioned a method in which the metal oxide (A) in the form of a bulk is pulverized using a pulverizer such as a ball mill or a jet mill, and the pulverized metal oxide (A) is dispersed in water or an organic solvent to prepare the liquid (S) (dispersion liquid including the metal oxide (A)). However, in the case of this method, control of the shape and size distribution of the particles of the metal oxide (A) may be difficult.

The type of the organic solvent usable in the step (a) is not particularly limited. For example, alcohols such as methanol, ethanol, isopropanol, and normal-propanol, are suitably used.

The content of the metal oxide (A) in the liquid (S) is preferably in the range of 0.1 mass % to 30 mass %, more preferably in the range of 1 mass % to 20 mass %, and even more preferably in the range of 2 mass % to 15 mass %.

In the step (b), the solution (T) including the phosphorus compound (B) is prepared. The solution (T) can be prepared by dissolving the phosphorus compound (B) in a solvent. In the case where the solubility of the phosphorus compound (B) is low, the dissolution may be promoted by performing heating treatment or ultrasonic treatment.

The solvent used for the preparation of the solution (T) may be selected as appropriate depending on the type of the phosphorus compound (B), and preferably includes water. As long as the dissolution of the phosphorus compound (B) is not hindered, the solvent may include: an alcohol such as methanol or ethanol; an ether such as tetrahydrofuran, dioxane, trioxane, or dimethoxyethane; a ketone such as acetone or methyl ethyl ketone; a glycol such as ethylene glycol or propylene glycol; a glycol derivative such as methyl cellosolve, ethyl cellosolve, or n-butyl cellosolve; glycerin; acetonitrile; an amide such as dimethylformamide; dimethylsulfoxide; sulfolane, or the like.

The content of the phosphorus compound (B) in the solution (T) is preferably in the range of 0.1 mass % to 99 mass %, more preferably in the range of 0.1 mass % to 95 mass %, and even more preferably in the range of 0.1 mass % to 90 mass %. The content of the phosphorus compound (B) in the solution (T) may be in the range of 0.1 mass % to 50 mass %, may be in the range of 1 mass % to 40 mass %, or may be in the range of 2 mass % to 30 mass %.

In the step (c), the liquid (S) and the solution (T) are mixed. When mixing the liquid (S) and the solution (T), it is preferable to perform the mixing at a reduced addition rate under vigorous stirring in order to suppress a local reaction. In this case, the solution (T) may be added to the liquid (S) being stirred, or the liquid (S) may be added to the solution (T) being stirred. The coating liquid (U) that is excellent in storage stability can be obtained in some cases by maintaining the temperature during the mixing at 30° C. or less (e.g., 20° C. or less). Furthermore, the coating liquid (U) that is excellent in storage stability can be obtained in some cases by continuing the stirring further for about 30 minutes after the completion of the mixing. A stirrer such as a homogenizer that can apply a strong shear force may be used.

The compound ($L^a$) may be mixed with the solution (T) in the step (b). Alternatively, the liquid (S), the solution (T), and the compound ($L^a$) may be mixed in the step (c). In this case, the compound ($L^a$) may be added to either the liquid (S) or the solution (T) before mixing of the liquid (S) and the solution (T), or the compound ($L^a$) may be added to a mixed liquid of the liquid (S) and the solution (T).

The coating liquid (U) may include the polymer (C). The method for having the polymer (C) included in the coating liquid (U) is not particularly limited. For example, the polymer (C) in the form of a powder or a pellet may be added to and then dissolved in the liquid (S), the solution (T), or a mixed liquid of the liquid (S) and the solution (T). Alternatively, a solution of the polymer (C) may be added to and mixed with the liquid (S), the solution (T), or a mixed liquid of the liquid (S) and the solution (T). Alternatively, the liquid (S), the solution (T), or a mixed liquid of the liquid (S) and the solution (T) may be added to and mixed with a solution of the polymer (C). By having the polymer (C) contained in the solution (T), the rate of reaction between the metal oxide (A) and the phosphorus compound (B) is slowed at the time of mixing of the liquid (S) and the solution (T) in the step (c), with the result that the coating liquid (U) that is excellent in temporal stability may be obtained.

The coating liquid (U) may include, as necessary, at least one acid compound (D) selected from acetic acid, hydrochloric acid, nitric acid, trifluoroacetic acid, and trichloroacetic acid. Hereinafter, the at least one acid compound (D) may be simply abbreviated as the "acid compound (D)". The method for having the acid compound (D) included in the coating liquid (U) is not particularly limited. For example, the acid compound (D) itself may be added to and mixed with the liquid (S), the solution (T), or a mixed liquid of the liquid (S) and the solution (T). Alternatively, a solution of the acid compound (D) may be added to and mixed with the liquid (S), the solution (T), or a mixed liquid of the liquid (S) and the solution (T). Alternatively, the liquid (S), the solution (T), or a mixed liquid of the liquid (S) and the solution (T) may be added to and mixed with a solution of the acid compound (D). When the solution (T) includes the acid compound (D), the rate of reaction between the hydrolytic condensate (A) and the phosphorus compound (B) is slowed at the time of mixing of the liquid (S) and the solution (T) in the step (c), with the result that the coating liquid (U) that is excellent in temporal stability may be obtained.

In the coating liquid (U) including the acid compound (D), the reaction between the metal oxide (A) and the phosphorus compound (B) is suppressed. Therefore, precipitation or aggregation of the reaction product in the coating liquid (U) can be suppressed. Thus, the use of the coating liquid (U) including the acid compound (D) improves the appearance of the resultant composite structure in some cases. In addition, the boiling point of the acid compound (D) is 200° C. or less. Therefore, in the production process of the composite structure, the acid compound (D) can easily be removed from the layer (Y), for example, by volatilizing the acid compound (D).

The content of the acid compound (D) in the coating liquid (U) is preferably in the range of 0.1 mass % to 5.0 mass %, and more preferably in the range of 0.5 mass % to 2.0 mass %. When the content is in such ranges, the effect of addition of the acid compound (D) can be obtained, and the removal of the acid compound (D) is easy. In the case where an acid substance remains in the liquid (S), the amount of the acid compound (D) to be added may be determined in view of the amount of the remaining acid substance.

The liquid itself obtained by the mixing in the step (c) can be used as the coating liquid (U). In this case, the solvent contained in the liquid (S) or the solution (T) usually acts as a solvent of the coating liquid (U). The coating liquid (U) may be prepared by performing a process for the liquid obtained by the mixing in the step (c). For example, a process such as addition of an organic solvent, adjustment of the pH, adjustment of the viscosity, or addition of an additive, may be performed.

An organic solvent may be added to the liquid obtained by the mixing in the step (c), to the extent that the stability of the resultant coating liquid (U) is not impaired. In some cases, the addition of the organic solvent makes it easy to apply the coating liquid (U) onto the base (X) in the step (II). The organic solvent is preferably one capable of being uniformly mixed in the resultant coating liquid (U). Preferred examples of the organic solvent include: alcohols such as methanol, ethanol, n-propanol, and isopropanol; ethers such as tetrahydrofuran, dioxane, trioxane, and dimethoxyethane; ketones such as acetone, methyl ethyl ketone, methyl vinyl ketone, and methyl isopropyl ketone; glycols such as ethylene glycol and propylene glycol; glycol derivatives such as methyl cellosolve, ethyl cellosolve, and n-butyl cellosolve; glycerin; acetonitrile; amides such as dimethylformamide and dimethylacetamide; dimethylsulfoxide; and sulfolane.

From the standpoint of the storage stability of the coating liquid (U) and from the standpoint of the performance of the coating liquid (U) in terms of application onto the base, the solid content concentration of the coating liquid (U) is preferably in the range of 1 mass % to 20 mass %, more preferably in the range of 2 mass % to 15 mass %, and even more preferably in the range of 3 mass % to 10 mass %. The solid content concentration of the coating liquid (U) can be calculated, for example, by adding a predetermined amount of the coating liquid (U) onto a laboratory dish, exposing the coating liquid (U) to a temperature of 100° C. together with the laboratory dish to remove volatile components such as the solvent, and dividing the mass of the remaining solid content by the mass of the initially-added coating liquid (U). In that case, it is preferable that the mass of the remaining solid content be measured each time drying is performed for a given period of time, and the solid content concentration be determined using the last-measured mass of the remaining solid content when the difference between the values of the mass obtained by the two successive measurements has reduced to a negligible level.

From the standpoint of the storage stability of the coating liquid (U) and the barrier properties of the composite structure, the pH of the coating liquid (U) is preferably in the range of 0.5 to 6.0, more preferably in the range of 0.5 to 5.0, and even more preferably in the range of 0.5 to 4.0.

The pH of the coating liquid (U) can be adjusted by a commonly-known method, and can be adjusted, for example, by adding an acidic compound or a basic compound. Examples of the acidic compound include hydrochloric acid, nitric acid, sulfuric acid, phosphoric acid, acetic acid, butyric acid, and ammonium sulfate. Examples of the basic compound include sodium hydroxide, potassium hydroxide, ammonia, trimethylamine, pyridine, sodium carbonate, and sodium acetate.

The coating liquid (U) changes in state over time, and tends to be converted finally into a gel composition or to undergo precipitation. The time to occurrence of such change in state depends on the composition of the coating liquid (U). In order to stably apply the coating liquid (U) onto the base (X), the viscosity of the coating liquid (U) is preferably stable over a long time. When the viscosity at the completion of the step (I) is defined as a reference viscosity, it is preferable to prepare the solution (U) so that the viscosity measured by a Brookfield viscometer (B-type viscometer: 60 rpm) be five times or less the reference viscosity even after the solution (U) is allowed to stand at 25° C. for two days. In many cases where the coating liquid (U) has a viscosity within such a range and is excellent in preservation stability, the composite structure that has more excellent barrier properties is obtained.

For example, adjustment of the solid content concentration, adjustment of the pH, or addition of a viscosity modifier can be employed as the method for adjusting the viscosity of the coating liquid (U) to the above range. Examples of the viscosity modifier include carboxymethyl cellulose, starch, bentonite, tragacanth gum, stearic acid salts, alginic acid salts, methanol, ethanol, n-propanol, and isopropanol.

The coating liquid (U) may include another substance other than the above-described substances, as long as the effect of the present invention is obtained. For example, the coating liquid (U) may include: an inorganic acid metal salt such as a metal carbonate, a metal hydrochloride, a metal nitrate, a metal hydrogen carbonate, a metal sulfate, a metal hydrogen sulfate, a metal borate, or an metal aluminate; an organic acid metal salt such as a metal oxalate, a metal acetate, a metal tartrate, or a metal stearate; a metal complex such as a metal acetylacetonate complex (aluminum acetylacetonate or the like), a cyclopentadienyl metal complex (titanocene or the like), or a cyanometal complex; a layered clay compound; a crosslinking agent; a polymer compound other than the polymer (C); a plasticizer; an antioxidant; an ultraviolet absorber; or a flame retardant.

[Step (II)]

In the step (II), a precursor layer of the layer (Y) is formed on the base (X) by applying the coating liquid (U) onto the base (X). The coating liquid (U) may be applied directly onto at least one surface of the base (X). Alternatively, before application of the coating liquid (U), the adhesive layer (H) may be formed on the surface of the base (X), for example, by treating the surface of the base (X) with a commonly-known anchor coating agent or by applying a commonly-known adhesive agent onto the surface of the base (X).

The coating liquid (U) may be subjected to degassing and/or defoaming as necessary. Examples of the method for degassing and/or defoaming are those using vacuum drawing, heating, centrifugation, ultrasonic waves, etc. A method including vacuum drawing can be preferably used.

The method for applying the coating liquid (U) onto the base (X) is not particularly limited, and a commonly-known method can be employed. Examples of preferred methods include casting, dipping, roll coating, gravure coating, screen printing, reverse coating, spray coating, kiss coating, die coating, metering bar coating, chamber doctor-using coating, and curtain coating.

In the step (II), the precursor layer of the layer (Y) is formed usually by removing the solvent in the coating liquid (U). The method for removing the solvent is not particularly limited, and a commonly-known drying method can be used. Specifically, drying methods such as hot-air drying, heat roll contact drying, infrared heating, and microwave heating can be used alone or in combination. The drying temperature is preferably 0° C. to 15° C. or more lower than the onset temperature of fluidization of the base (X). In the case where the coating liquid (U) includes the polymer (C), the drying temperature is preferably 15° C. to 20° C. or more lower than the onset temperature of pyrolysis of the polymer (C). The drying temperature is preferably in the range of 70° C. to 200° C., more preferably in the range of 80° C. to 180° C., and even more preferably in the range of 90° C. to 160° C. The removal of the solvent may be carried out under ordinary pressure or under reduced pressure. Alternatively, the solvent may be removed by heat treatment in the step (III) described later.

In the case where the layers (Y) are stacked on both surfaces of the base (X) that is in the form of a layer, a first layer (a precursor layer of a first layer (Y)) may be formed by applying the coating liquid (U) onto one surface of the base (X) and then removing the solvent, and a second layer (a precursor layer of a second layer (Y)) may be subsequently formed by applying the coating liquid (U) onto the other surface of the base (X) and then removing the solvent. The compositions of the coating liquids (U) applied onto the two surfaces may be the same or different.

In the case where the layers (Y) are stacked on a plurality of surfaces of the base (X) that has a three-dimensional shape, a layer (a precursor layer of the layer (Y)) may be formed on each of the surfaces by the above method. Alternatively, a plurality of layers (precursor layers of the layers (Y)) may be simultaneously formed by applying the coating liquid (U) simultaneously onto the plurality of surfaces of the base (X) and drying the coating liquid (U).

[Step (III)]

In the step (III), the layer (Y) is formed by treating the precursor layer (the precursor layer of the layer (Y)) formed in the step (II). Examples of the method for treating the precursor layer include heat treatment and irradiation with an electromagnetic ray such as an ultraviolet ray. The treatment performed in the step (III) may be a treatment for reacting the metal oxide (A) and the phosphorus compound (B). For example, the treatment performed in the step (III) may be a treatment for reacting the metal oxide (A) and the phosphorus compound (B) so that the particles of the metal oxide (A) are bonded together via phosphorus atoms derived from the phosphorus compound (B). The step (III) is usually a step of subjecting the precursor layer to heat treatment at a temperature of 110° C. or more.

In the step (III), a reaction in which the particles of the metal oxide (A) are bonded together via phosphorus atoms (phosphorus atoms derived from the phosphorus compound (B)) proceeds. From another standpoint, a reaction in which the reaction product (R) is generated proceeds in the step (III). In order for the reaction to proceed sufficiently, the temperature of the heat treatment is 110° C. or more, preferably 120° C. or more, more preferably 140° C. or more, and even more preferably 170° C. or more. A lowered heat treatment temperature increases the time required to achieve sufficient reaction, and causes reduction in productivity. The preferred upper limit of the heat treatment temperature varies depending on, for example, the type of the base (X). For example, in the case where a thermoplastic resin film made of polyamide resin is used as the base (X), the heat treatment temperature is preferably 190° C. or less. In the case where a thermoplastic resin film made of polyester resin is used as the base (X), the heat treatment temperature is preferably 220° C. or less. The heat treatment can be carried out in air, a nitrogen atmosphere, an argon atmosphere, or the like.

The length of time of the heat treatment is preferably in the range of 0.1 seconds to 1 hour, more preferably in the range of 1 second to 15 minutes, and even more preferably in the range of 5 seconds to 300 seconds. In an example, the heat treatment is performed at 110° C. to 220° C. for 0.1 seconds to 1 hour. In another example, the heat treatment is performed at 120° C. to 200° C. for 5 seconds to 300 seconds (e.g., 60 seconds to 300 seconds).

The method of the present invention for producing the composite structure may include a step of irradiating the layer (Y) or the precursor layer of the layer (Y) with an ultraviolet ray. The ultraviolet irradiation may be performed at any time after the step (II) (e.g., after the removal of the solvent of the applied coating liquid (U) is almost completed). The method of the irradiation is not particularly limited, and a commonly-known method can be employed. The wavelength of the ultraviolet ray for irradiation is preferably in the range of 170 nm to 250 nm, and more preferably in the range of 170 nm to 190 nm and/or 230 nm to 250 nm. Alternatively, irradiation with a radioactive ray such as an electron ray or a γ ray may be performed instead of the ultraviolet irradiation. Performing the ultraviolet irradiation may allow the composite structure to exhibit higher barrier performance.

In the case of treating the surface of the base (X) with a commonly-known anchor coating agent or applying a commonly-known adhesive agent onto the surface of the base (X) before application of the coating liquid (U) in order to dispose the adhesive layer (H) between the base (X) and the layer (Y), aging treatment is preferably performed. Specifically, the base (X) having the coating liquid (U) applied thereto is preferably left at a relatively low temperature for a long time after the application of the coating liquid (U) but before the heat treatment of the step (III). The temperature of the aging treatment is preferably less than 110° C., more preferably 100° C. or less, and even more preferably 90° C. or less. The temperature of the aging treatment is preferably 10° C. or more, more preferably 20° C. or more, and even more preferably 30° C. or more. The length of time of the aging treatment is preferably in the range of 0.5 days to 10 days, more preferably in the range of 1 day to 7 days, and even more preferably in the range of 1 day to 5 days. Performing such aging treatment further enhances the adhesive force between the base (X) and the layer (Y).

The composite structure itself obtained through the heat treatment of the step (III) can be used as the composite structure of the present invention. However, as described above, another member (another layer or the like) may be further adhered or formed onto the composite structure, and the resultant structure may be used as the composite structure of the present invention. The adhesion of the member can be performed by a commonly-known method.

[Coating Liquid]

The coating liquid used in the present invention is the coating liquid (U) described above. That is, the coating liquid of the present invention includes the metal oxide (A), the phosphorus compound (B), the compound ($L^a$), and a solvent. As described above, the coating liquid of the present invention may further include at least one selected from the group consisting of the polymer (C) and the acid compound (D). The layer (Y) can be formed by subjecting a layer formed of the coating liquid (U) of the present invention to heat treatment at a temperature of 110° C. or more.

EXAMPLES

Hereinafter, the present invention will be described more specifically with reference to examples. However, the present invention is not limited by the examples given below. The measurements and evaluations in the examples and comparative examples were carried out by the methods (1) to (6) described below.

(1) Infrared Absorption Spectrum of Layer (Y) (or Layer (Y'))

Infrared absorption spectra of the layers (Y) formed in the examples and infrared absorption spectra of the layers (Y') formed in the comparative examples were measured by the method described below.

First, for a composite structure in which an oriented polyethylene terephthalate (PET) film was used as the base, the infrared absorption spectrum of the layer (Y) or (layer (Y')) was measured using a Fourier transform infrared spectrophotometer ("Spectrum One" manufactured by PerkinElmer Inc.). The infrared absorption spectrum was measured in the range of 700 $cm^{-1}$ to 4000 $cm^{-1}$ in ATR (attenuated total reflectance) mode. In some cases where the thickness of the layer (Y) (or layer (Y')) is 1 μm or less, an absorption peak attributed to the base (X) is detected in an infrared absorption spectrum obtained by the ATR method, and the absorption intensity attributed only to the layer (Y) (or layer (Y')) cannot be determined accurately. In such a case, the infrared absorption spectrum of the base (X) alone was measured separately, and was subtracted to extract only the peak attributed to the layer (Y) (or layer (Y')). The same measurement as above was performed also for composite structures in which other bases (an oriented nylon film and the like) than the PET film were used.

(2) Oxygen Barrier Properties Before Bending Process

The oxygen transmission rate (OTR) was measured using an oxygen transmission amount measuring apparatus ("MOCON OX-TRAN 2/20" manufactured by ModernControls, Inc.). Specifically, the composite structure was set in such a manner that the layer (Y) (or layer (Y')) faced the oxygen supply-side and the CPP layer described later faced the carrier gas-side, and then the oxygen transmission rate (in units of ml/($m^2$·day·atm)) was measured under conditions that the temperature was 20° C., the humidity on the oxygen supply-side was 85% RH, the humidity on the carrier gas-side was 85% RH, the oxygen pressure was 1 atm, and the carrier gas pressure was 1 atm. Nitrogen gas containing 2 vol % of hydrogen gas was used as the carrier gas.

(3) Water Vapor Barrier Properties Before Bending Process

The moisture permeability (water vapor transmission rate: WVTR) was measured using a water vapor transmission amount measuring apparatus ("MOCON PERMATRAN 3/33" manufactured by ModernControls, Inc.). Specifically, the composite structure was set in such a manner that the layer (Y) (or layer (Y')) faced the water vapor supply-side and the CPP layer described later faced the carrier gas-side, and then the moisture permeability (in units of g/($m^2$·day)) was measured under conditions that the temperature was 40° C., the humidity on the water vapor supply-side was 90% RH, and the humidity on the carrier gas-side was 0% RH.

(4) Bending Process

The composite structure was subjected to bending using a Gelbo flex tester (manufactured by Rigaku Kogyo K.K.) so that physical impact and deformation were applied to the layered body. Specifically, the composite structure was cut into an A4 size, and was subjected to bending at 50 cycles by the Gelbo flex tester. Samples for measurements of the oxygen barrier properties and water vapor barrier properties were cut out from a central portion of the composite structure having been subjected to the bending.

(5) Oxygen Barrier Properties after Bending Process

The oxygen transmission rate of the composite structure after the bending process was measured under the same conditions as for "(2) Oxygen barrier properties before bending process".

(6) Water Vapor Barrier Properties after Bending Process

The moisture permeability of the composite structure after the bending process was measured under the same conditions as for "(3) Water vapor barrier properties before bending process".

Example 1

An amount of 230 parts by mass of distilled water was heated up to 70° C. under stirring. An amount of 88 parts by mass of aluminum isopropoxide was added dropwise to the distilled water over 1 hour, the liquid temperature was gradually increased up to 95° C., and isopropanol generated was distilled off. In this manner, hydrolytic condensation was performed. To the obtained liquid was added 4.0 parts by mass of a 60 mass % nitric acid aqueous solution, followed by stirring at 95° C. for 3 hours to deflocculate the aggregate of the hydrolytic condensate. The thus-obtained dispersion liquid was concentrated so that the solid content concentration was 10 mass % in terms of alumina concentration. Thus, a dispersion liquid (S1) was obtained.

Next, 13.41 parts by mass of distilled water and 4.70 parts by mass of methanol were added to 5.60 parts by mass of the dispersion liquid (S1). The mixture was made homogeneous by stirring, and thus a dispersion liquid (S1') was obtained. In addition, an 85 mass % phosphoric acid aqueous solution was prepared as a solution (T1). Subsequently, 1.10 parts by mass of the solution (T1) was added dropwise to the dispersion liquid (S1') being stirred, and 0.15 parts by mass of a 5 mass % PVA solution was further added dropwise. To the obtained liquid, 0.05 parts by mass of tetraethoxysilane was further added dropwise. Stirring was then continued for further 30 minutes after the completion of the dropwise addition, and thus a coating liquid (U1) was obtained.

Next, an oriented polyethylene terephthalate film ("Lumirror P60" (trade name) manufactured by TORAY INDUSTRIES, INC. and having a thickness of 12 μm) was prepared as a base (this film may be abbreviated as "PET" hereinafter). The coating liquid (U1) was coated onto the base (PET) with a bar coater in such a manner that the thickness after drying was 0.5 μm. Drying was performed at 100° C. for 5 minutes to form a precursor layer of a layer (Y1). The obtained layered body was subjected to heat treatment using a dryer at 180° C. for 1 minute, and thus a composite structure (A1) having a configuration of layer (Y1) (thickness: 0.5 μm)/PET (12 μm) was obtained. For the obtained composite structure (A1), the infrared absorption spectrum of the layer (Y1) (layer (Y)) was measured by the method described above.

Subsequently, a non-oriented polypropylene film ("RXC-21" (trade name) manufactured by Tohcello Co., Ltd. and having a thickness of 50 μm) was prepared (this film may be abbreviated as "CPP" hereinafter). A two-component adhesive agent ("A-520" (trade name) and "A-50" (trade name) manufactured by Mitsui Takeda Chemicals, Inc.) was coated onto the CPP and then dried. The resultant product and the composite structure (A1) were laminated together. In this manner, a composite structure (B1) having a configuration of layer (Y1)/PET/adhesive agent/CPP was obtained. For the obtained composite structure (B1), the oxygen barrier properties and water vapor barrier properties before and after the bending process were evaluated by the methods described above.

Example 2

To 5.60 parts by mass of the dispersion liquid (S1) prepared in the same manner as in Example 1, 12.82 parts by mass of distilled water and 4.70 parts by mass of methanol were added. The mixture was made homogeneous by stirring, and thus a dispersion liquid (S2) was obtained. In addition, an 85 mass % phosphoric acid aqueous solution was prepared as a solution (T2). Subsequently, 1.10 parts by mass of the solution (T2) was added dropwise to the dispersion liquid (S2) being stirred, and 0.15 parts by mass of a 5 mass % PVA solution was further added dropwise. To the obtained liquid, 0.64 parts by mass of tetraethoxysilane was further added dropwise. Stirring was then continued for further 30 minutes after the completion of the dropwise addition, and thus a coating liquid (U2) was obtained.

A composite structure (A2) having a configuration of layer (Y2) (0.5 μm)/PET (12 μm) was obtained in the same manner as in Example 1, except that the coating liquid (U2) was used instead of the coating liquid (U1). For the obtained composite structure (A2), the infrared absorption spectrum of the layer (Y2) (layer (Y)) was measured by the method described above.

Subsequently, a composite structure (B2) having a configuration of layer (Y2)/PET/adhesive agent/CPP was obtained in the same manner as in Example 1, except that the composite structure (A2) was used instead of the composite structure (A1). For the obtained composite structure (B2), the oxygen barrier properties and water vapor barrier properties before and after the bending process were evaluated by the methods described above.

Example 3

To 5.60 parts by mass of the dispersion liquid (S1) prepared in the same manner as in Example 1, 13.34 parts by mass of distilled water and 4.70 parts by mass of methanol were added. The mixture was made homogeneous by stirring, and thus a dispersion liquid (S3) was obtained. In addition, an 85 mass % phosphoric acid aqueous solution was prepared as a solution (T3). Subsequently, 1.10 parts by mass of the solution (T3) was added dropwise to the dispersion liquid (S3) being stirred, and 0.15 parts by mass of a 5 mass % PVA solution was further added dropwise. To the obtained liquid, 0.11 parts by mass of tetraethoxysilane was further added dropwise. Stirring was then continued for further 30 minutes after the completion of the dropwise addition, and thus a coating liquid (U3) was obtained.

A composite structure (A3) having a configuration of layer (Y3) (0.5 μm)/PET (12 μm) was obtained in the same manner as in Example 1, except that the coating liquid (U3) was used instead of the coating liquid (U1). For the obtained composite structure (A3), the infrared absorption spectrum of the layer (Y3) (layer (Y)) was measured by the method described above.

Subsequently, a composite structure (B3) having a configuration of layer (Y3)/PET/adhesive agent/CPP was obtained in the same manner as in Example 1, except that the composite structure (A3) was used instead of the composite structure (A1). For the obtained composite structure (B3), the oxygen barrier properties and water vapor barrier properties before and after the bending process were evaluated by the methods described above.

Example 4

To 5.60 parts by mass of the dispersion liquid (S1) prepared in the same manner as in Example 1, 12.91 parts by mass of distilled water and 4.70 parts by mass of methanol were added. The mixture was made homogeneous by stirring, and thus a dispersion liquid (S4) was obtained. In addition, an 85 mass % phosphoric acid aqueous solution was prepared as a solution (T4). Subsequently, 1.10 parts by mass of the solution (T4) was added dropwise to the dispersion liquid (S4) being stirred, and 0.15 parts by mass of a 5 mass % PVA solution was further added dropwise. To the obtained liquid, 0.55 parts by mass of tetraethoxysilane was further added dropwise. Stirring was then continued for further 30 minutes after the completion of the dropwise addition, and thus a coating liquid (U4) was obtained.

A composite structure (A4) having a configuration of layer (Y4) (0.5 μm)/PET (12 μm) was obtained in the same manner as in Example 1, except that the coating liquid (U4) was used instead of the coating liquid (U1). For the obtained composite structure (A4), the infrared absorption spectrum of the layer (Y4) (layer (Y)) was measured by the method described above.

Subsequently, a composite structure (B4) having a configuration of layer (Y4)/PET/adhesive agent/CPP was obtained in the same manner as in Example 1, except that the composite structure (A4) was used instead of the composite structure (A1). For the obtained composite structure (B4), the oxygen barrier properties and water vapor barrier properties before and after the bending process were evaluated by the methods described above.

Example 5

To 5.60 parts by mass of the dispersion liquid (S1) prepared in the same manner as in Example 1, 13.00 parts by mass of distilled water and 4.70 parts by mass of methanol were added. The mixture was made homogeneous by stirring, and thus a dispersion liquid (S5) was obtained. In addition, an 85 mass % phosphoric acid aqueous solution was prepared as a solution (T5). Subsequently, 1.10 parts by mass of the solution (T5) was added dropwise to the dispersion liquid (S5) being stirred, and 0.15 parts by mass of a 5 mass % PVA solution was further added dropwise. To the obtained liquid, 0.46 parts by mass of tetraethoxysilane was further added dropwise. Stirring was then continued for further 30 minutes after the completion of the dropwise addition, and thus a coating liquid (U5) was obtained.

A composite structure (A5) having a configuration of layer (Y5) (0.5 μm)/PET (12 μm) was obtained in the same manner as in Example 1, except that the coating liquid (U5)

was used instead of the coating liquid (U1). For the obtained composite structure (A5), the infrared absorption spectrum of the layer (Y5) (layer (Y)) was measured by the method described above.

Subsequently, a composite structure (B5) having a configuration of layer (Y5)/PET/adhesive agent/CPP was obtained in the same manner as in Example 1, except that the composite structure (A5) was used instead of the composite structure (A1). For the obtained composite structure (B5), the oxygen barrier properties and water vapor barrier properties before and after the bending process were evaluated by the methods described above.

Example 6

To 5.60 parts by mass of the dispersion liquid (S1) prepared in the same manner as in Example 1, 13.00 parts by mass of distilled water and 4.70 parts by mass of methanol were added. The mixture was made homogeneous by stirring, and thus a dispersion liquid (S6) was obtained. In addition, an 85 mass % phosphoric acid aqueous solution was prepared as a solution (T6). Subsequently, 0.46 parts by mass of tetraethoxysilane was added dropwise to the dispersion liquid (S6) being stirred, and 1.10 parts by mass of the solution (T6) was further added dropwise. To the obtained liquid, 0.15 parts by mass of a 5 mass % PVA solution was further added dropwise. Stirring was then continued for further 30 minutes after the completion of the dropwise addition, and thus a coating liquid (U6) was obtained.

A composite structure (A6) having a configuration of layer (Y6) (0.5 μm)/PET (12 μm) was obtained in the same manner as in Example 1, except that the coating liquid (U6) was used instead of the coating liquid (U1). For the obtained composite structure (A6), the infrared absorption spectrum of the layer (Y6) (layer (Y)) was measured by the method described above.

Subsequently, a composite structure (B6) having a configuration of layer (Y6)/PET/adhesive agent/CPP was obtained in the same manner as in Example 1, except that the composite structure (A6) was used instead of the composite structure (A1). For the obtained composite structure (B6), the oxygen barrier properties and water vapor barrier properties before and after the bending process were evaluated by the methods described above.

Example 7

To 5.60 parts by mass of the dispersion liquid (S1) prepared in the same manner as in Example 1, 13.29 parts by mass of distilled water and 4.40 parts by mass of methanol were added. The mixture was made homogeneous by stirring, and thus a dispersion liquid (S7) was obtained. Subsequently, 1.33 parts by mass of trimethyl phosphate was added dropwise to the dispersion liquid (S7) being stirred, and 0.15 parts by mass of a 5 mass % PVA solution was further added dropwise. To the obtained liquid, 0.46 parts by mass of tetraethoxysilane was further added dropwise. Stirring was then continued for further 30 minutes after the completion of the dropwise addition, and thus a coating liquid (U7) was obtained.

A composite structure (A7) having a configuration of layer (Y7) (0.5 μm)/PET (12 μm) was obtained in the same manner as in Example 1, except that the coating liquid (U7) was used instead of the coating liquid (U1). For the obtained composite structure (A7), the infrared absorption spectrum of the layer (Y7) (layer (Y)) was measured by the method described above.

Subsequently, a composite structure (B7) having a configuration of layer (Y7)/PET/adhesive agent/CPP was obtained in the same manner as in Example 1, except that the composite structure (A7) was used instead of the composite structure (A1). For the obtained composite structure (B7), the oxygen barrier properties and water vapor barrier properties before and after the bending process were evaluated by the methods described above.

Example 8

To 5.60 parts by mass of the dispersion liquid (S1) prepared in the same manner as in Example 1, 13.00 parts by mass of distilled water and 4.70 parts by mass of methanol were added. The mixture was made homogeneous by stirring, and thus a dispersion liquid (S8) was obtained. In addition, an 85 mass % phosphoric acid aqueous solution was prepared as a solution (T8). Subsequently, 1.10 parts by mass of the solution (T8) was added dropwise to the dispersion liquid (S8) being stirred, and 0.15 parts by mass of a 5% PAA solution was further added dropwise. To the obtained liquid, 0.46 parts by mass of tetraethoxysilane was further added dropwise. Stirring was then continued for further 30 minutes after the completion of the dropwise addition, and thus a coating liquid (U8) was obtained.

A composite structure (A8) having a configuration of layer (Y8) (0.5 μm)/PET (12 μm) was obtained in the same manner as in Example 1, except that the coating liquid (U8) was used instead of the coating liquid (U1). For the obtained composite structure (A8), the infrared absorption spectrum of the layer (Y8) (layer (Y)) was measured by the method described above.

Subsequently, a composite structure (B8) having a configuration of layer (Y8)/PET/adhesive agent/CPP was obtained in the same manner as in Example 1, except that the composite structure (A8) was used instead of the composite structure (A1). For the obtained composite structure (B8), the oxygen barrier properties and water vapor barrier properties before and after the bending process were evaluated by the methods described above.

Example 9

To 5.60 parts by mass of the dispersion liquid (S1) prepared in the same manner as in Example 1, 13.40 parts by mass of distilled water and 4.70 parts by mass of methanol were added. The mixture was made homogeneous by stirring, and thus a dispersion liquid (S9) was obtained. In addition, an 85 mass % phosphoric acid aqueous solution was prepared as a solution (T9). Subsequently, 1.10 parts by mass of the solution (T9) was added dropwise to the dispersion liquid (S9) being stirred, and 0.15 parts by mass of a 5 mass % PVA solution was added dropwise. To the obtained liquid, 0.05 parts by mass of γ-isocyanatopropyltriethoxysilane was further added dropwise. Stirring was then continued for further 30 minutes after the completion of the dropwise addition, and thus a coating liquid (U9) was obtained.

A composite structure (A9) having a configuration of layer (Y9) (0.5 μm)/PET (12 μm) was obtained in the same manner as in Example 1, except that the coating liquid (U9) was used instead of the coating liquid (U1). For the obtained composite structure (A9), the infrared absorption spectrum of the layer (Y9) (layer (Y)) was measured by the method described above.

Subsequently, a composite structure (B9) having a configuration of layer (Y9)/PET/adhesive agent/CPP was obtained in the same manner as in Example 1, except that the composite structure (A9) was used instead of the composite structure (A1). For the obtained composite structure (B9), the oxygen barrier properties and water vapor barrier properties before and after the bending process were evaluated by the methods described above.

Example 10

To 5.60 parts by mass of the dispersion liquid (S1) prepared in the same manner as in Example 1, 13.24 parts by mass of distilled water and 4.70 parts by mass of methanol were added. The mixture was made homogeneous by stirring, and thus a dispersion liquid (S10) was obtained. In addition, an 85 mass % phosphoric acid aqueous solution was prepared as a solution (T10). Subsequently, 1.10 parts by mass of the solution (T10) was added dropwise to the dispersion liquid (S10) being stirred, and 0.15 parts by mass of a 5 mass % PVA solution was added dropwise. To the obtained liquid, 0.22 parts by mass of γ-isocyanatopropyltriethoxysilane was further added dropwise. Stirring was then continued for further 30 minutes after the completion of the dropwise addition, and thus a coating liquid (U10) was obtained.

A composite structure (A10) having a configuration of layer (Y10) (0.5 μm)/PET (12 μm) was obtained in the same manner as in Example 1, except that the coating liquid (U10) was used instead of the coating liquid (U1). For the obtained composite structure (A10), the infrared absorption spectrum of the layer (Y10) (layer (Y)) was measured by the method described above.

Subsequently, a composite structure (B10) having a configuration of layer (Y10)/PET/adhesive agent/CPP was obtained in the same manner as in Example 1, except that the composite structure (A10) was used instead of the composite structure (A1). For the obtained composite structure (B10), the oxygen barrier properties and water vapor barrier properties before and after the bending process were evaluated by the methods described above.

Example 11

To 5.60 parts by mass of the dispersion liquid (S1) prepared in the same manner as in Example 1, 13.05 parts by mass of distilled water and 4.70 parts by mass of methanol were added. The mixture was made homogeneous by stirring, and thus a dispersion liquid (S11) was obtained. In addition, an 85 mass % phosphoric acid aqueous solution was prepared as a solution (T11). Subsequently, 1.10 parts by mass of the solution (T11) was added dropwise to the dispersion liquid (S11) being stirred, and 0.15 parts by mass of a 5 mass % PVA solution was further added dropwise. To the obtained liquid, 0.41 parts by mass of γ-isocyanatopropyltrimethoxysilane was further added dropwise. Stirring was then continued for further 30 minutes after the completion of the dropwise addition, and thus a coating liquid (U11) was obtained.

A composite structure (A11) having a configuration of layer (Y11) (0.5 μm)/PET (12 μm) was obtained in the same manner as in Example 1, except that the coating liquid (U11) was used instead of the coating liquid (U1). For the obtained composite structure (A11), the infrared absorption spectrum of the layer (Y11) (layer (Y)) was measured by the method described above.

Subsequently, a composite structure (B11) having a configuration of layer (Y11)/PET/adhesive agent/CPP was obtained in the same manner as in Example 1, except that the composite structure (A11) was used instead of the composite structure (A1). For the obtained composite structure (B11), the oxygen barrier properties and water vapor barrier properties before and after the bending process were evaluated by the methods described above.

Example 12

To 5.60 parts by mass of the dispersion liquid (S1) prepared in the same manner as in Example 1, 13.29 parts by mass of distilled water and 4.70 parts by mass of methanol were added. The mixture was made homogeneous by stirring, and thus a dispersion liquid (S12) was obtained. In addition, an 85 mass % phosphoric acid aqueous solution was prepared as a solution (T12). Subsequently, 1.10 parts by mass of the solution (T12) was added dropwise to the dispersion liquid (S12) being stirred, and 0.15 parts by mass of a 5 mass % PVA solution was further added dropwise. To the obtained liquid, 0.17 parts by mass of vinyltriethoxysilane was further added dropwise. Stirring was then continued for further 30 minutes after the completion of the dropwise addition, and thus a coating liquid (U12) was obtained.

A composite structure (A12) having a configuration of layer (Y12) (0.5 μm)/PET (12 μm) was obtained in the same manner as in Example 1, except that the coating liquid (U12) was used instead of the coating liquid (U1). For the obtained composite structure (A12), the infrared absorption spectrum of the layer (Y12) (layer (Y)) was measured by the method described above.

Subsequently, a composite structure (B12) having a configuration of layer (Y12)/PET/adhesive agent/CPP was obtained in the same manner as in Example 1, except that the composite structure (A12) was used instead of the composite structure (A1). For the obtained composite structure (B12), the oxygen barrier properties and water vapor barrier properties before and after the bending process were evaluated by the methods described above.

Example 13

To 5.60 parts by mass of the dispersion liquid (S1) prepared in the same manner as in Example 1, 13.13 parts by mass of distilled water and 4.70 parts by mass of methanol were added. The mixture was made homogeneous by stirring, and thus a dispersion liquid (S13) was obtained. In addition, an 85 mass % phosphoric acid aqueous solution was prepared as a solution (T13). Subsequently, 1.10 parts by mass of the solution (T13) was added dropwise to the dispersion liquid (S13) being stirred, and 0.15 parts by mass of a 5 mass % PVA solution was further added dropwise. To the obtained liquid, 0.10 parts by mass of tetraethoxysilane and 0.23 parts by mass of γ-aminopropyltrimethoxysilane were further added dropwise. Stirring was then continued for further 30 minutes after the completion of the dropwise addition, and thus a coating liquid (U13) was obtained.

A composite structure (A13) having a configuration of layer (Y13) (0.5 μm)/PET (12 μm) was obtained in the same manner as in Example 1, except that the coating liquid (U13) was used instead of the coating liquid (U1). For the obtained composite structure (A13), the infrared absorption spectrum of the layer (Y13) (layer (Y)) was measured by the method described above.

Subsequently, a composite structure (B13) having a configuration of layer (Y13)/PET/adhesive agent/CPP was obtained in the same manner as in Example 1, except that the composite structure (A13) was used instead of the composite structure (A1). For the obtained composite structure (B13), the oxygen barrier properties and water vapor barrier properties before and after the bending process were evaluated by the methods described above.

Example 14

To 8.58 parts by mass of the dispersion liquid (S1) prepared in the same manner as in Example 1, 10.12 parts by mass of distilled water and 4.70 parts by mass of methanol were added. The mixture was made homogeneous by stirring, and thus a dispersion liquid (S14) was obtained. In addition, an 85 mass % phosphoric acid aqueous solution was prepared as a solution (T14). Subsequently, 0.75 parts by mass of the solution (T14) was added dropwise to the dispersion liquid (S14) being stirred, and 0.15 parts by mass of a 5 mass % PVA solution was further added dropwise. To the obtained liquid, 0.70 parts by mass of tetraethoxysilane was further added dropwise. Stirring was then continued for further 30 minutes after the completion of the dropwise addition, and thus a coating liquid (U14) was obtained.

A composite structure (A14) having a configuration of layer (Y14) (0.5 µm)/PET (12 µm) was obtained in the same manner as in Example 1, except that the coating liquid (U14) was used instead of the coating liquid (U1). For the obtained composite structure (A14), the infrared absorption spectrum of the layer (Y14) (layer (Y)) was measured by the method described above.

Subsequently, a composite structure (B14) having a configuration of layer (Y14)/PET/adhesive agent/CPP was obtained in the same manner as in Example 1, except that the composite structure (A14) was used instead of the composite structure (A1). For the obtained composite structure (B14), the oxygen barrier properties and water vapor barrier properties before and after the bending process were evaluated by the methods described above.

Example 15

To 5.30 parts by mass of the dispersion liquid (S1) prepared in the same manner as in Example 1, 13.29 parts by mass of distilled water and 4.70 parts by mass of methanol were added. The mixture was made homogeneous by stirring, and thus a dispersion liquid (S15) was obtained. In addition, an 85 mass % phosphoric acid aqueous solution was prepared as a solution (T15). Subsequently, 1.13 parts by mass of the solution (T15) was added dropwise to the dispersion liquid (S15) being stirred, and 0.15 parts by mass of a 5 mass % PVA solution was further added dropwise. To the obtained liquid, 0.43 parts by mass of tetraethoxysilane was further added dropwise. Stirring was then continued for further 30 minutes after the completion of the dropwise addition, and thus a coating liquid (U15) was obtained.

A composite structure (A15) having a configuration of layer (Y15) (0.5 µm)/PET (12 µm) was obtained in the same manner as in Example 1, except that the coating liquid (U15) was used instead of the coating liquid (U1). For the obtained composite structure (A15), the infrared absorption spectrum of the layer (Y15) (layer (Y)) was measured by the method described above.

Subsequently, a composite structure (B15) having a configuration of layer (Y15)/PET/adhesive agent/CPP was obtained in the same manner as in Example 1, except that the composite structure (A15) was used instead of the composite structure (A1). For the obtained composite structure (B15), the oxygen barrier properties and water vapor barrier properties before and after the bending process were evaluated by the methods described above.

Example 16

To 9.18 parts by mass of the dispersion liquid (S1) prepared in the same manner as in Example 1, 9.55 parts by mass of distilled water and 4.70 parts by mass of methanol were added. The mixture was made homogeneous by stirring, and thus a dispersion liquid (S16) was obtained. In addition, an 85 mass % phosphoric acid aqueous solution was prepared as a solution (T16). Subsequently, 0.68 parts by mass of the solution (T16) was added dropwise to the dispersion liquid (S16) being stirred, and 0.15 parts by mass of a 5 mass % PVA solution was further added dropwise. To the obtained liquid, 0.75 parts by mass of tetraethoxysilane was further added dropwise. Stirring was then continued for further 30 minutes after the completion of the dropwise addition, and thus a coating liquid (U16) was obtained.

A composite structure (A16) having a configuration of layer (Y16) (0.5 µm)/PET (12 µm) was obtained in the same manner as in Example 1, except that the coating liquid (U16) was used instead of the coating liquid (U1). For the obtained composite structure (A16), the infrared absorption spectrum of the layer (Y16) (layer (Y)) was measured by the method described above.

Subsequently, a composite structure (B16) having a configuration of layer (Y16)/PET/adhesive agent/CPP was obtained in the same manner as in Example 1, except that the composite structure (A16) was used instead of the composite structure (A1). For the obtained composite structure (B16), the oxygen barrier properties and water vapor barrier properties before and after the bending process were evaluated by the methods described above.

Example 17

To 4.70 parts by mass of the dispersion liquid (S1) prepared in the same manner as in Example 1, 13.86 parts by mass of distilled water and 4.70 parts by mass of methanol were added. The mixture was made homogeneous by stirring, and thus a dispersion liquid (S17) was obtained. In addition, an 85 mass % phosphoric acid aqueous solution was prepared as a solution (T17). Subsequently, 1.20 parts by mass of the solution (T17) was added dropwise to the dispersion liquid (S17) being stirred, and 0.15 parts by mass of a 5 mass % PVA solution was further added dropwise. To the obtained liquid, 0.38 parts by mass of tetraethoxysilane was further added dropwise. Stirring was then continued for further 30 minutes after the completion of the dropwise addition, and thus a coating liquid (U17) was obtained.

A composite structure (A17) having a configuration of layer (Y17) (0.5 µm)/PET (12 µm) was obtained in the same manner as in Example 1, except that the coating liquid (U17) was used instead of the coating liquid (U1). For the obtained composite structure (A17), the infrared absorption spectrum of the layer (Y17) (layer (Y)) was measured by the method described above.

Subsequently, a composite structure (B17) having a configuration of layer (Y17)/PET/adhesive agent/CPP was obtained in the same manner as in Example 1, except that the composite structure (A17) was used instead of the composite structure (A1). For the obtained composite structure (B17), the oxygen barrier properties and water vapor barrier properties before and after the bending process were evaluated by the methods described above.

Example 18

To 10.07 parts by mass of the dispersion liquid (S1) prepared in the same manner as in Example 1, 8.68 parts by mass of distilled water and 4.70 parts by mass of methanol were added. The mixture was made homogeneous by stirring, and thus a dispersion liquid (S18) was obtained. In addition, an 85 mass % phosphoric acid aqueous solution was prepared as a solution (T18). Subsequently, 0.57 parts by mass of the solution (T18) was added dropwise to the dispersion liquid (S18) being stirred, and 0.15 parts by mass of a 5 mass % PVA solution was further added dropwise. To the obtained liquid, 0.82 parts by mass of tetraethoxysilane was further added dropwise. Stirring was then continued for further 30 minutes after the completion of the dropwise addition, and thus a coating liquid (U18) was obtained.

A composite structure (A18) having a configuration of layer (Y18) (0.5 µm)/PET (12 µm) was obtained in the same manner as in Example 1, except that the coating liquid (U18) was used instead of the coating liquid (U1). For the obtained composite structure (A18), the infrared absorption spectrum of the layer (Y18) (layer (Y)) was measured by the method described above.

Subsequently, a composite structure (B18) having a configuration of layer (Y18)/PET/adhesive agent/CPP was obtained in the same manner as in Example 1, except that the composite structure (A18) was used instead of the composite structure (A1). For the obtained composite structure (B18), the oxygen barrier properties and water vapor barrier properties before and after the bending process were evaluated by the methods described above.

Example 19

To 5.60 parts by mass of the dispersion liquid (S1) prepared in the same manner as in Example 1, 13.30 parts by mass of distilled water and 4.70 parts by mass of methanol were added. The mixture was made homogeneous by stirring, and thus a dispersion liquid (S19) was obtained. In addition, an 85 mass % phosphoric acid aqueous solution was prepared as a solution (T19). Subsequently, 1.10 parts by mass of the solution (T19) was added dropwise to the dispersion liquid (S19) being stirred, and 0.15 parts by mass of a 5 mass % PVA solution was further added dropwise. To the obtained liquid, 0.16 parts by mass of γ-aminopropyltrimethoxysilane was further added dropwise. Stirring was then continued for further 30 minutes after the completion of the dropwise addition, and thus a coating liquid (U19) was obtained.

A composite structure (A19) having a configuration of layer (Y19) (0.5 µm)/PET (12 µm) was obtained in the same manner as in Example 1, except that the coating liquid (U19) was used instead of the coating liquid (U1). For the obtained composite structure (A19), the infrared absorption spectrum of the layer (Y19) (layer (Y)) was measured by the method described above.

Subsequently, a composite structure (B19) having a configuration of layer (Y19)/PET/adhesive agent/CPP was obtained in the same manner as in Example 1, except that the composite structure (A19) was used instead of the composite structure (A1). For the obtained composite structure (B19), the oxygen barrier properties and water vapor barrier properties before and after the bending process were evaluated by the methods described above.

Comparative Example 1

To 5.60 parts by mass of the dispersion liquid (S1) prepared in the same manner as in Example 1, 13.46 parts by mass of distilled water and 4.70 parts by mass of methanol were added. The mixture was made homogeneous by stirring, and thus a dispersion liquid (SC1) was obtained. In addition, an 85 mass % phosphoric acid aqueous solution was prepared as a solution (TC1). Subsequently, 1.10 parts by mass of the solution (TC1) was added dropwise to the dispersion liquid (SC1) being stirred, and 0.15 parts by mass of a 5 mass % PVA solution was further added dropwise. Stirring was continued for further 30 minutes after the completion of the dropwise addition, and thus a coating liquid (UC1) was obtained.

A composite structure (AC1) having a configuration of layer (YC1) (0.5 µm)/PET (12 µm) was obtained in the same manner as in Example 1, except that the coating liquid (UC1) was used instead of the coating liquid (U1). For the obtained composite structure (AC1), the infrared absorption spectrum of the layer (YC1) (layer (Y')) was measured by the method described above.

Subsequently, a composite structure (BC1) having a configuration of layer (YC1)/PET/adhesive agent/CPP was obtained in the same manner as in Example 1, except that the composite structure (AC1) was used instead of the composite structure (A1). For the obtained composite structure (BC1), the oxygen barrier properties and water vapor barrier properties before and after the bending process were evaluated by the methods described above.

Comparative Example 2

To 5.60 parts by mass of the dispersion liquid (S1) prepared in the same manner as in Example 1, 12.66 parts by mass of distilled water and 4.70 parts by mass of methanol were added. The mixture was made homogeneous by stirring, and thus a dispersion liquid (SC2) was obtained. In addition, an 85 mass % phosphoric acid aqueous solution was prepared as a solution (TC2). Subsequently, 1.10 parts by mass of the solution (TC2) was added dropwise to the dispersion liquid (SC2) being stirred, and 0.15 parts by mass of a 5 mass % PVA solution was further added dropwise. To the obtained liquid, 0.80 parts by mass of tetraethoxysilane was further added dropwise. Stirring was then continued for further 30 minutes after the completion of the dropwise addition, and thus a coating liquid (UC2) was obtained.

A composite structure (AC2) having a configuration of layer (YC2) (0.5 µm)/PET (12 µm) was obtained in the same manner as in Example 1, except that the coating liquid (UC2) was used instead of the coating liquid (U1). For the obtained composite structure (AC2), the infrared absorption spectrum of the layer (YC2) (layer (Y')) was measured by the method described above.

Subsequently, a composite structure (BC2) having a configuration of layer (YC2)/PET/adhesive agent/CPP was obtained in the same manner as in Example 1, except that the composite structure (AC2) was used instead of the composite structure (A1). For the obtained composite structure (BC2), the oxygen barrier properties and water vapor barrier properties before and after the bending process were evaluated by the methods described above.

Comparative Example 3

To 5.60 parts by mass of the dispersion liquid (S1) prepared in the same manner as in Example 1, 12.61 parts by mass of distilled water and 4.70 parts by mass of methanol were added. The mixture was made homogeneous by stirring, and thus a dispersion liquid (SC3) was obtained. In addition, an 85 mass % phosphoric acid aqueous solution was prepared as a solution (TC3). Subsequently, 1.10 parts by mass of the solution (TC3) was added dropwise to the dispersion liquid (SC3) being stirred, and 0.15 parts by mass of a 5 mass % PVA solution was further added dropwise. To the obtained liquid, 0.57 parts by mass of tetraethoxysilane and 0.27 parts by mass of γ-isocyanatopropyltriethoxysilane were further added dropwise. Stirring was then continued for further 30 minutes after the completion of the dropwise addition, and thus a coating liquid (UC3) was obtained.

A composite structure (AC3) having a configuration of layer (YC3) (0.5 μm)/PET (12 μm) was obtained in the same manner as in Example 1, except that the coating liquid (UC3) was used instead of the coating liquid (U1). For the obtained composite structure (AC3), the infrared absorption spectrum of the layer (YC3) (layer (Y')) was measured by the method described above.

Subsequently, a composite structure (BC3) having a configuration of layer (YC3)/PET/adhesive agent/CPP was obtained in the same manner as in Example 1, except that the composite structure (AC3) was used instead of the composite structure (A1). For the obtained composite structure (BC3), the oxygen barrier properties and water vapor barrier properties before and after the bending process were evaluated by the methods described above.

Comparative Example 4

To 2.24 parts by mass of the dispersion liquid (S1) prepared in the same manner as in Example 1, 16.24 parts by mass of distilled water and 4.70 parts by mass of methanol were added. The mixture was made homogeneous by stirring, and thus a dispersion liquid (SC4) was obtained. In addition, an 85 mass % phosphoric acid aqueous solution was prepared as a solution (TC4). Subsequently, 1.49 parts by mass of the solution (TC4) was added dropwise to the dispersion liquid (SC4) being stirred, and 0.15 parts by mass of a 5 mass % PVA solution was further added dropwise. To the obtained liquid, 0.18 parts by mass of tetraethoxysilane was further added dropwise. Stirring was then continued for further 30 minutes after the completion of the dropwise addition, and thus a coating liquid (UC4) was obtained.

A composite structure (AC4) having a configuration of layer (YC4) (0.5 μm)/PET (12 μm) was obtained in the same manner as in Example 1, except that the coating liquid (UC4) was used instead of the coating liquid (U1). For the obtained composite structure (AC4), the infrared absorption spectrum of the layer (YC4) (layer (Y')) was measured by the method described above.

Subsequently, a composite structure (BC4) having a configuration of layer (YC4)/PET/adhesive agent/CPP was obtained in the same manner as in Example 1, except that the composite structure (AC4) was used instead of the composite structure (A1). For the obtained composite structure (BC4), the oxygen barrier properties and water vapor barrier properties before and after the bending process were evaluated by the methods described above.

Comparative Example 5

To 11.19 parts by mass of the dispersion liquid (S1) prepared in the same manner as in Example 1, 7.60 parts by mass of distilled water and 4.70 parts by mass of methanol were added. The mixture was made homogeneous by stirring, and thus a dispersion liquid (SC5) was obtained. In addition, an 85 mass % phosphoric acid aqueous solution was prepared as a solution (TC5). Subsequently, 0.44 parts by mass of the solution (TC5) was added dropwise to the dispersion liquid (SC5) being stirred, and 0.15 parts by mass of a 5 mass % PVA solution was further added dropwise. To the obtained liquid, 0.91 parts by mass of tetraethoxysilane was further added dropwise. Stirring was then continued for further 30 minutes after the completion of the dropwise addition, and thus a coating liquid (UC5) was obtained.

A composite structure (AC5) having a configuration of layer (YC5) (0.5 μm)/PET (12 μm) was obtained in the same manner as in Example 1, except that the coating liquid (UC5) was used instead of the coating liquid (U1). For the obtained composite structure (AC5), the infrared absorption spectrum of the layer (YC5) (layer (Y')) was measured by the method described above.

Subsequently, a composite structure (BC5) having a configuration of layer (YC5)/PET/adhesive agent/CPP was obtained in the same manner as in Example 1, except that the composite structure (AC5) was used instead of the composite structure (A1). For the obtained composite structure (BC5), the oxygen barrier properties and water vapor barrier properties before and after the bending process were evaluated by the methods described above.

The production conditions and evaluation results for the examples and comparative examples are shown in Table 1.

TABLE 1

| | Compound ($L^1$) | | Compound ($L^2$) | | | | Phosphorus compound | Polymer (C) | Infrared absorption ($n^1$) (cm$^{-1}$) | Oxygen transmission rate ml/(m$^2$ · day · atm) | | Moisture permeability g/(m$^2$ · day) | |
|---|---|---|---|---|---|---|---|---|---|---|---|---|---|
| | $N_{Si1}/N_M$ | Type | $N_{Si2}/N_M$ | Type | $N_{Si}/N_M$ | $N_M/N_P$ | | | | Before bending | After bending | Before bending | After bending |
| Example 1 | 0.02 | TEOS | — | — | 0.02 | 1.15 | Phosphoric acid | PVA | 1108 | 0.3 | 2.9 | 0.2 | 1.7 |
| Example 2 | 0.28 | TEOS | — | — | 0.28 | 1.15 | Phosphoric acid | PVA | 1107 | 0.8 | 1.9 | 0.4 | 1.2 |
| Example 3 | 0.05 | TEOS | — | — | 0.05 | 1.15 | Phosphoric acid | PVA | 1108 | 0.3 | 2.4 | 0.2 | 1.4 |
| Example 4 | 0.24 | TEOS | — | — | 0.24 | 1.15 | Phosphoric acid | PVA | 1108 | 0.5 | 1.7 | 0.3 | 1.2 |
| Example 5 | 0.20 | TEOS | — | — | 0.20 | 1.15 | Phosphoric acid | PVA | 1107 | 0.4 | 1.5 | 0.2 | 1.0 |
| Example 6 | 0.20 | TEOS | — | — | 0.20 | 1.15 | Phosphoric acid | PVA | 1107 | 0.4 | 1.7 | 0.3 | 1.1 |
| Example 7 | 0.20 | TEOS | — | — | 0.20 | 1.15 | Trimethyl phosphate | PVA | 1108 | 0.5 | 1.5 | 0.3 | 1.2 |
| Example 8 | 0.20 | TEOS | — | — | 0.20 | 1.15 | Phosphoric acid | PAA | 1107 | 0.4 | 1.6 | 0.2 | 1.1 |
| Example 9 | — | — | 0.02 | I-SC | 0.02 | 1.15 | Phosphoric acid | PVA | 1107 | 0.3 | 2.1 | 0.2 | 1.3 |

TABLE 1-continued

| | Compound (L¹) | | Compound (L²) | | | | Phosphorus compound | Polymer (C) | Infrared absorption (n¹) (cm⁻¹) | Oxygen transmission rate ml/(m²·day·atm) | | Moisture permeability g/(m²·day) | |
|---|---|---|---|---|---|---|---|---|---|---|---|---|---|
| | $N_{Si1}/N_M$ | Type | $N_{Si2}/N_M$ | Type | $N_{Si}/N_M$ | $N_M/N_P$ | | | | Before bending | After bending | Before bending | After bending |
| Example 10 | — | — | 0.08 | I-SC | 0.08 | 1.15 | Phosphoric acid | PVA | 1108 | 0.4 | 1.4 | 0.2 | 0.9 |
| Example 11 | — | — | 0.15 | I-SC | 0.15 | 1.15 | Phosphoric acid | PVA | 1107 | 0.6 | 1.8 | 0.4 | 1.3 |
| Example 12 | — | — | 0.08 | V-SC | 0.08 | 1.15 | Phosphoric acid | PVA | 1107 | 0.4 | 2.3 | 0.3 | 1.4 |
| Example 13 | 0.10 | TEOS | 0.05 | A-SC | 0.15 | 1.15 | Phosphoric acid | PVA | 1107 | 0.4 | 1.3 | 0.2 | 0.8 |
| Example 14 | 0.20 | TEOS | — | — | 0.20 | 2.60 | Phosphoric acid | PVA | 1109 | 0.7 | 2.3 | 0.4 | 1.4 |
| Example 15 | 0.20 | TEOS | — | — | 0.20 | 1.06 | Phosphoric acid | PVA | 1111 | 0.9 | 2.6 | 0.4 | 1.5 |
| Example 16 | 0.20 | TEOS | — | — | 0.20 | 3.07 | Phosphoric acid | PVA | 1112 | 0.9 | 2.5 | 0.4 | 1.6 |
| Example 17 | 0.20 | TEOS | — | — | 0.20 | 0.88 | Phosphoric acid | PVA | 1113 | 1.0 | 2.7 | 0.5 | 1.7 |
| Example 18 | 0.20 | TEOS | — | — | 0.20 | 3.99 | Phosphoric acid | PVA | 1118 | 1.1 | 2.8 | 0.5 | 1.6 |
| Example 19 | — | — | 0.08 | A-SC | 0.08 | 1.15 | Phosphoric acid | PVA | 1107 | 0.4 | 1.5 | 0.2 | 1.0 |
| Comparative Example 1 | — | — | — | — | — | 1.15 | Phosphoric acid | PVA | 1107 | 0.2 | 3.9 | 0.2 | 2.1 |
| Comparative Example 2 | 0.35 | TEOS | — | — | 0.35 | 1.15 | Phosphoric acid | PVA | 1108 | 1.2 | 4.2 | 6.5 | 6.6 |
| Comparative Example 3 | 0.24 | TEOS | 0.09 | I-SC | 0.33 | 1.15 | Phosphoric acid | PVA | 1108 | 1.3 | 3.6 | 6.1 | 6.5 |
| Comparative Example 4 | 0.20 | TEOS | — | — | 0.20 | 0.34 | Phosphoric acid | PVA | — | 5.0 | 11.3 | 6.4 | 6.5 |
| Comparative Example 5 | 0.20 | TEOS | — | — | 0.20 | 5.77 | Phosphoric acid | PVA | — | 3.8 | 8.9 | 6.3 | 6.5 |

[Abbreviations in Table]
PVA: Polyvinyl alcohol, PAA: Polyacrylic acid
TEOS: Tetraethoxysilane
I-SC: γ-isocyanatopropyltriethoxysilane
V-SC: Vinyltriethoxysilane
A-SC: γ-aminopropyltrimethoxysilane
$N_{Si1}/N_M$: The ratio of the number of moles $N_{Si1}$ of Si atoms derived from the compound (L¹) to the number of moles ($N_M$) of metal atoms in the metal oxide (A)
$N_{Si2}/N_M$: The ratio of the number of moles $N_{Si2}$ of Si atoms derived from the compound (L²) to the number of moles ($N_M$) of metal atoms in the metal oxide (A)
$N_{Si}/N_M$: The ratio of the number of moles $N_{Si}$ of Si atoms derived from the compound ($L^a$) to the number of moles ($N_M$) of metal atoms in the metal oxide (A)
$N_M/N_P$: The ratio of the number of moles ($N_M$) of metal atoms in the metal oxide (A) to the number of moles ($N_P$) of phosphorus atoms derived from the phosphorus compound (B)
Infrared absorption (n¹): The location of the infrared absorption peak present in the range of 1080 cm⁻¹ to 1130 cm⁻¹.

In Table 1, "-" means "not used", "not calculable", "not carried out", "not measurable", or the like.

As is clear from Table 1, the composite structures of the examples exhibited excellent oxygen barrier properties and water vapor barrier properties not only before the bending process but also after the bending process. The composite structure of Example 13 exhibited higher oxygen barrier properties and water vapor barrier properties after bending than the composite structures of the other examples.

INDUSTRIAL APPLICABILITY

The composite structure of the present invention is excellent in both gas barrier properties and water vapor barrier properties, and can maintain both of the barrier properties at high levels even after bending. In addition, the composite structure of the present invention is excellent in appearance. Therefore, the composite structure of the present invention can be used preferably as a packaging material for foods, chemicals, medical devices, industrial materials, and garments. Among such uses, the composite structure of the present invention can be particularly preferably used for forming a food packaging material required to have barrier properties against both oxygen and water vapor.

The invention claimed is:

1. A composite structure comprising a base (X) and a layer (Y) stacked on the base (X), wherein
the layer (Y) comprises a mixture of a metal oxide (A), a phosphorus compound (B), and a compound ($L^a$),
the phosphorus compound (B) is a compound comprising a site capable of reacting with the metal oxide (A),
the layer (Y) comprises a reaction product (R) formed by a reaction at least between the metal oxide (A) and the phosphorus compound (B),
the metal oxide (A) is a hydrolytic condensate of an aluminum alkoxide,
the compound ($L^a$) comprises a compound (L¹),
the compound (L¹) is at least one compound selected from the group consisting of tetramethoxysilane, tetraethoxysilane, tetrapropoxysilane, tetrabutoxysilane, and derivatives thereof,
$N_{Si}$ and $N_M$ satisfy $0.04 \leq N_{Si}/N_M \leq 0.25$ when the number of moles of metal atoms (M) derived from the metal oxide (A) in the layer (Y) is denoted by $N_M$ and the number of moles of Si atoms derived from the compound ($L^a$) in the layer (Y) is denoted by $N_{Si}$, and
$N_M$ and $N_P$ satisfy $0.8 \leq N_M/N_P \leq 4.5$ when the number of moles of phosphorus atoms derived from the phosphorus compound (B) in the layer (Y) is denoted by $N_P$.

2. The composite structure according to claim 1, wherein the aluminum alkoxide comprises at least one compound selected from the group consisting of aluminum triisopropoxide and aluminum tri-s-butoxide.

3. The composite structure according to claim 1, wherein the phosphorus compound (B) is at least one compound selected from the group consisting of phosphoric acid, polyphosphoric acid, phosphorous acid, phosphonic acid, and derivatives thereof.

4. The composite structure according to claim 1, wherein the layer (Y) has an infrared absorption peak in a range of 1080 cm⁻¹ to 1130 cm⁻¹.

5. The composite structure according to claim 1, wherein the layer (Y) further comprises a polymer (C) comprising at least one functional group (f) selected from the group consisting of a hydroxyl group, a carboxyl group, a carboxylic acid anhydride group, and a salt of a carboxyl group.

6. The composite structure according to claim 5, wherein the polymer (C) is at least one polymer selected from the group consisting of polyvinyl alcohol, ethylene-vinyl alcohol copolymer, a polysaccharide, polyacrylic acid, a salt of polyacrylic acid, polymethacrylic acid, and a salt of polymethacrylic acid.

7. The composite structure according to claim 1, wherein the base (X) is in the form of a layer.

8. The composite structure according to claim 7, wherein the base (X) comprises at least one layer selected from the group consisting of a thermoplastic resin film layer, a paper layer, and an inorganic deposited layer.

9. A packaging material comprising the composite structure according to claim 1.

10. A formed product comprising the composite structure according to claim 1.

11. The formed product according to claim 10, wherein the formed product is a vertical form fill seal pouch, a vacuum packaging pouch, a spout pouch, a laminated tube container, an infusion bag, a container cover, a paper container, or a vacuum insulator.

12. A method for producing the composite structure according to claim 1, the method comprising:
(I) mixing at least the metal oxide (A), the phosphorus compound (B) comprising a site capable of reacting with the metal oxide (A), the compound ($L^a$), and a solvent, to obtain a coating liquid (U) comprising the metal oxide (A), the phosphorus compound (B), the compound ($L^a$), and the solvent;
(II) applying the coating liquid (U) onto the base (X) to obtain a precursor layer of the layer (Y) on the base (X); and
(III) heat treating the precursor layer at a temperature of 110° C. or more.

13. The method according to claim 12, wherein the aluminum alkoxide comprises at least one compound selected from the group consisting of aluminum triisopropoxide and aluminum tri-s-butoxide.

14. The method according to claim 12, wherein the phosphorus compound (B) is at least one compound selected from the group consisting of phosphoric acid, polyphosphoric acid, phosphorous acid, phosphonic acid, and derivatives thereof.

15. The method according to claim 12, wherein the layer (Y) further comprises a polymer (C) comprising at least one functional group (f) selected from the group consisting of a hydroxyl group, a carboxyl group, a carboxylic acid anhydride group, and a salt of a carboxyl group.

16. The method according to claim 15, wherein the polymer (C) is at least one polymer selected from the group consisting of polyvinyl alcohol, ethylene-vinyl alcohol copolymer, a polysaccharide, polyacrylic acid, a salt of polyacrylic acid, polymethacrylic acid, and a salt of polymethacrylic acid.

17. The method according to claim 12, wherein (I) comprises:
(a) preparing a liquid (S) comprising the metal oxide (A);
(b) preparing a solution (T) comprising the phosphorus compound (B); and
(c) mixing the liquid (S) and the solution (T).

18. The method according to claim 17, wherein the compound ($L^a$) is mixed with the solution (T) in (b), or the liquid (S), the solution (T), and the compound ($L^a$) are mixed in (c).

19. The method according to claim 12, wherein a length of time of the heat treatment is in a range of 0.1 seconds to 1 hour.

20. A coating liquid suitable for use in the method according to claim 12, comprising: a metal oxide (A); a phosphorus compound (B) comprising a site capable of reacting with the metal oxide (A); a compound ($L^a$); and a solvent, wherein
the metal oxide (A) is a hydrolytic condensate of an aluminum alkoxide,
the compound ($L^a$) is at least one compound ($L^1$) selected from the group consisting of tetramethoxysilane, tetraethoxysilane, tetrapropoxysilane, tetrabutoxysilane, and derivatives thereof,
$N_{Si}$ and $N_M$ satisfy $0.04 \leq N_{Si}/N_M \leq 0.25$ when the number of moles of metal atoms (M) included in the metal oxide (A) is denoted by $N_M$ and the number of moles of Si atoms included in the compound ($L^a$) is denoted by $N_{Si}$, and
$N_M$ and $N_P$ satisfy $0.8 \leq N_M/N_P \leq 4.5$ when the number of moles of phosphorus atoms included in the phosphorus compound (B) is denoted by $N_P$.

21. The composite structure according to claim 1, wherein the compound ($L^a$) further comprises a compound ($L^2$) represented by formula (II):

$$SiX^2_p Z_q R^2_{(4-p-q)} \qquad (II),$$

wherein:
$X^2$ is selected from the group consisting of F, Cl, Br, I, $R^2O$—, $R^2COO$—, $(R^2CO)_2CH$—, and $NO_3$;
Z is an organic group having at least one functional group selected from the group consisting of a vinyl group, an epoxy group, a styryl group, a methacryl group, an acryl group, an amino group, a ureido group, a mercapto group, a sulfide group, an isocyanate group, a hydroxyl group, and a chloro group;
$R^2$ is selected from the group consisting of an alkyl group, an aralkyl group, an aryl group, and an alkenyl group;
p represents an integer from 1 to 3;
q represents an integer from 1 to 3; and
$2 \leq (p+q) \leq 4$ is satisfied,
and wherein:
when a plurality of $X^2$ are included in the formula (II), the plurality of $X^2$ may be the same as or different from each other,
when a plurality of Z are included in the formula (II), the plurality of Z may be the same as or different from each other,
when a plurality of $R^2$ are included in the formula (II), the plurality of $R^2$ may be the same as or different from each other.

22. The composite structure according to claim 21, wherein
Z in formula (II) is an amino group and/or an isocyanate group.

23. The composite structure according to claim 22, wherein
the compound ($L^2$) is at least one selected from the group consisting of γ-aminopropyltrimethoxysilane, γ-aminopropyltriethoxysilane, N-β-aminoethyl-γ-aminopropyltrimethoxysilane, N-β-aminoethyl-γ-aminopropyltriethoxysilane, isocyanatopropyltrimethoxysilane, and γ-isocyanatopropyltriethoxysilane.

24. The composite structure according to claim 21, wherein $N_{Si2}$ and $N_M$ satisfy $0.01 \leq N_{Si2}/N_M \leq 0.10$ when the number of moles of the Si element included in the compound ($L^2$) is denoted by $N_{Si2}$.

* * * * *